United States Patent [19]

Bado et al.

[11] Patent Number: 4,703,423
[45] Date of Patent: Oct. 27, 1987

[54] APPARATUS AND METHOD FOR GENERATION OF BRAND NAME SPECIFIC ADVERTISING MEDIA

[75] Inventors: Charles W. Bado, Ft. Lauderdale; Randy Detrick, Hollywood, both of Fla.

[73] Assignee: Recipe Terminal Corporation, Fort Lauderdale, Fla.

[21] Appl. No.: 629,415

[22] Filed: Jul. 10, 1984

[51] Int. Cl.⁴ .............................................. G06F 15/20
[52] U.S. Cl. ...................................... 364/400; 364/401
[58] Field of Search ............... 364/400, 401, 200, 900, 364/300

[56] References Cited

U.S. PATENT DOCUMENTS

| | | | |
|---|---|---|---|
| 4,388,689 | 6/1983 | Hayman et al. | 364/401 |
| 4,437,159 | 3/1984 | Waugh | 364/400 |
| 4,503,502 | 5/1985 | Chapin | 364/400 |

Primary Examiner—Jerry Smith
Assistant Examiner—Kim Thanh Tbui
Attorney, Agent, or Firm—John H. Faro

[57] ABSTRACT

An apparatus and a data processing methodology for the creation, display and/or generation of brand name specific advertising media based upon a combination of sponsor and consumer input, is provided by this invention. The apparatus and methodology of this invention have application in diverse environments with the principal utilization criteria being the consumer's need to compose an integrated listing of elements in the form of an individualized package from among a selection of products and/or services of unrelated suppliers (sponsors). The resultant listing derivative from this methodology is brand name specific, hence the characterization of such listing as an "advertising medium." For example, this brand name specific medium can be formated as a recipe card file or as an integrated shopping list. In both of the foregoing formats, the brand name of the product sponsor is featured for each item/ingredient of the meal/recipe. Typical apparatus used in the creation of this media can include one or more consumer accessible computer terminals located within a supermarket environment; or a terminal in the consumer's home. The system and methodology of this invention have application not only in the supermarket environment but also in the composition of a travel itinerary (travel agency environment) and estate/financial/investment planning (independent insurance agency environment).

22 Claims, 8 Drawing Figures

SHRIMP ARMAND

| | |
|---|---|
| 1 bag | HIGHLINER* Froz. Shrimp |
| 0.25 cup | DUKES* Peanut Oil 32 oz. |
| 0.25 cup | MUSSELMAN'S* White Vinegar 16 oz. |
| 1 Tbl | McCORMICK* Chopped Chive 0.12 |
| 1 Tbl | CRYSTAL* Chili Sauce 6 oz. |
| 2 tsp | GULDEN'S* Hot Mustard 8 oz. |
| 1 | SPICE WORLD* Garlic 2 oz. |
| 0.25 tsp | McCORMICK* Paprika 1.75 oz. |

INSTRUCTIONS

Cook bag of shrimp (1 lb. 5 oz.) according to package directions. Drain and cool.

Combine oil, white vinegar, chives, chili sauce, hot mustard, garlic, and salt. Add cooled shrimp; toss well.

Cover and refrigerate at least 3 hours, tossing occasionally.

To serve, drain, sprinkle lightly with paprika.

S-ave or E-xit <S>

FIG 6

ROUTED SHOPPING LIST

| Aisle | Quantity | Brand Name Specific Item |
|---|---|---|
| A5 | 2 | *HUNTS* Tomatoes 15 oz. |
| A8 | 1 | POMPEIIAN* Olive Oil 4 oz |
| B4 | 1 | MORTON* Iodized Salt |
| B5 | 1 | McCORMICK'S* Parsley |
| B6 | 1 | McCORMICK'S* Pepper 1 oz. |
| C3 | 1 | GULDEN'S* Hot Mustard 8 oz. |
| C4 | 1 | CRYSTAL* Chili Sauce 6 oz. |
| D2 | 1 | *TROPICANA* Orange Juice 32 oz. |
| D3 | 1 | PUBLIX* Premium Grade Eggs |
| D5 | 1 | SEALTEST* Heavy Cream 1 pint |
| F3 | 1 | ARMOUR* Duck 5-6 lb. |
| F3 | 1 | HIGHLINER* Froz. Shrimp 8 oz. |
| G | 1 | PROGRESSO Bread Crumbs |
| G3 | 1 | Potato Starch |
| G3 | 1 | *SUE BEE* Honey 24 oz. |
| G4 | 1 | MUSSELMAN'S* White Vinegar 16 oz. |
| P2 | 2 | Orange Peelings |
| P2 | 1 | Fresh Orange Sections |
| P3 | 1 | GALLO* Hearty Burgundy |
| S3 | 1 | McCORMICK* Ginger 1 oz. |
| S4 | 1 | DIXIE CRYSTAL Powder Sugar 1 lb. |
| S4 | 1 | McCORMICK* Vanilla 2 oz. |
| S4 | 1 | McCORMICK* Chopped Chive 0.12 oz. |
| S4 | 1 | MAZOLA* Salad Oil 16 oz. |
| S7 | 1 | McCORMICK* Paprika 1.75 oz. |
| S8 | 1 | DUKES* Peanut Oil 32 oz. |
| T6 | 1 | SPICE WORLD* Garlic 2 oz. |

*Coupon Available Below

HUNTS® TOMATOES         25¢ OFF

TROPICANA® ORANGE JUICE    50¢ OFF

SUE BEE® HONEY            10¢ OFF

FIG 8

APPARATUS AND METHOD FOR GENERATION OF BRAND NAME SPECIFIC ADVERTISING MEDIA

BACKGROUND OF THE INVENTION

1. Field of the Invention

This invention is directed to a data processing methodology and a means for the implementation of such methodology. More specifically, this invention concerns itself with methods for the promotion of brand name products and services (including store brands) through the use of an advertising medium which is based upon a combination of sponsor and consumer input. This invention has application in diverse environments with the principal utilization criteria being the consumer's need to compose an integrated listing of elements in the form of an individualized package from among a selection of products and/or services of unrelated supplies (sponsors). In a typical supermarket environment, this invention can be implemented on a consumer accessible terminal which has been programmed with appropriate brand name specific data and complimentary application software. The consumer can select from among the available choices on the main program menu and submenus which appear on the terminal display, store his interim selections in a non-volatile memory (ie work file) within the terminal, edit his interim selections and eventually retrieve them in a recipe file card format and/or an integrated shopping list. In both of these formats, the individual ingredients are specified by brand name (to the extent of sponsor participation).

2. Description of the Prior Art

In the modern supermarket, the inventory of available items offered to the consumer can often number in excess of 10,000. Brand recognition and favorable shelf placement are thus imperative for effective distribution of such consumer products; especially where the amount of time and care exercised in making of a consumer purchasing decision is limited and the presence of competing products can created confusion and/or distraction. Accordingly, the effective marketing of such consumer products in the supermarket environment requires extensive advertising, visually attractive packaging, and incentives (i.e. coupons) to influence the consumer purchasing decisions. The consumer selection process in this environment, is thus determined primarily by brand recognition and the favorable placement of the product on the supermarket shelf. As is readily apparent, the established methods for influencing consumer purchasing decisions favors the established brand name products and the larger companies with substantial advertising budgets. The lesser known brands are, thus, permanently subordinated to the "majors" in both consumer identification and in the exposure received in the retail environment. The barrier to effective competition and to effective entry of new products into the marketplace from an unestablished source is thus formidable; and, at best the prospects for success of such new entrants are marginal. The net effect is reduced competition, limited selection, and higher prices to the consumer.

From the consumer viewpoint, especially the busy career-oriented individual, the process of meal planning, creation of shopping lists, and selection of products by brand name is becoming an increasingly time consuming and unnecessarily complicated task. As of the present, there is nothing currently available to the consumer to provide the needed assistance to expedite the planning, selection, and ultimately, this purchasing process. The busy career-oriented individual, even if he/she had the time, is not particularly interested in scouring newspaper advertising and/or coupon mailings for shopping suggestions. Moreover, even if he/she were so inclined, these advertisements and promotional mailings generally only feature a single product or a limited selection of products. It still remains for the consumer to build a meal plan around one or more of these featured items, identify recipes in which such items can be used, coordinate the selection of additional ingredients needed to supplement this recipe and, ultimately, compose a shopping list. If the consumer has the time and patience to proceed to this point in the meal planning process, he/she is still required to estimate the quantities of the items needed for each serving of each recipe in the meal plan, and to adjust his purchasing plan depending upon whether the numbers of the servings provided by a particular recipe correspond to his/her individual needs.

At the present time, there is available to individuals who own personal computers, software packages which can assist in this meal planning process. One such package entitled, THE MICRO COOKBOOK, (available from Virtual Combinatics of Rockport, Mass.), provides a simple, but somewhat cumbersome method to assist in the composition of a meal plan. The menu selections available on this software package are indeed quite limited, however, include suggestions for recipes for utilization of ingredients on hand, as well as, for composing a shopping list. This software also permits the user to add recipes to the existing recipe file. Each of the recipes in the file also include instructions on preparation of the dish from the listed ingredients. The number of servings of a particular recipe can also be adjusted to suit the individual user's needs. When a shopping list is desired for a meal plan having a number of dishes, the program will produce an integrated shopping list, identifying each of the items required to prepare all the dishes of the meal plan. Unfortunately, this software does not assist the consumer in the making of a purchasing decision, nor does it have the capability to suggest or identify the possible substitution of a convenience (prepared) food item for one requiring involved preparation.

Accordingly, even the limited number of consumers, who own or have access to both a personal computer and a software package of equivalent capability to THE MICRO COOKBOOK, will ultimately base their selection of the individual items for recipes of the mean plan upon brand recognition and/or favorable shelf placement in a supermarket. Thus, the relatively little known consumer products (and oftentimes less expensive) go largely unnoticed even though they could be readily substituted for one having more prominent shelf placement and a more attractive package.

The difficulty in creation of brand recognition in the consumer marketplace also presents a formidable task for the established distributors of consumer products. The time and expense required to launch a new product is continually increasing and thus, prevents a formidable barrier to the number of new entrants which can be effectively introduced into the marketplace within a given period of time.

The difficulties described above, with respect to composition of a shopping list for groceries are indeed trivial in comparison to consumer participation in the selection process for planning an itinerary for a trip; or in the composition of an estate/investment/retirement portfolio from the various offerings of underwriters of such investment services. It is thus apparent, that the more specialized or complicated the selection process, the less likely that the consumer will fully participate in this process. This increased dependence of the consumer upon the judgements of others further frustrates the individual in the exercise of effective control over decisions which are material to his individual needs and preferences.

Thus, there is a continuing need to provide the means to assist distributors of consumer products and services in increasing the consumer awareness of their offerings in a way that is both cost effective and will be well received by the purchasing public. There is also a continuing need to provide assistance to the consumer in the planning of his purchasing decisions in a manner whereby such planning process can be effected within a minimal period of time and yet provide an effective method for conscious selection of his purchases from a brand name specific shopping list of goods and/or services.

OBJECTS OF THE INVENTION

Accordingly, it is the object of this invention to remedy the above as well as related deficiencies in the prior art.

More specifically, it is the principle object of this invention to provide a novel advertising medium in a format which assists consumers in the planning of their purchases.

It is another object of this invention to provide a readily accessible means whereby consumers can plan their purchasing decisions in an environment which is both tailored to their individual needs and the needs of the merchandisers of such products.

It is yet another object of this invention to provide an integrated advertising medium which promotes the noncompeting products from different companies (sponsors).

It is yet another object of this invention to provide an integrated advertising medium which provides for the promotion of both national and local brands on a common format.

It is still yet another object of this invention to provide an integrated advertising medium which can be adapted for the promotion of items of regional preference.

It is a further object of this invention to provide an integrated advertising medium which can be adapted for the promotion of items of seasonal preference.

It is yet another object of this invention to provide an integrated advertising medium which can be adapted for the promotion of items of ethnic preference.

It is still a further object of this invention to provide an integrated advertising medium which can be adapted for the promotion of items of dietary preference.

Further additional objects of this invention include the provision of an integrated advertising medium for consumer products and/or services which can satisfy all the foregoing promotional preferences of a sponsor and yet be capable of presenting to the consumer an integrated list itemizing such products and/or services in a format which can assist him/her in the planning of purchases of brand name offerings which are featured in the above format.

SUMMARY OF THE INVENTION

The above and related objects of this invention are achieved by providing a system having at least two (2) system master files: (a) one of these system master files containing a listing of goods and/or services, by generic name, organized in prescribed fields of classification related to the environment of use (i.e. meal planning; travel itinerary planning; estate/investment/retirement portfolio planning, etc.); and, (b) a second system master file containing a corresponding listing of goods and/or services by brand name and sponsor affiliation.

For ease of illustration, the operation of the system and methodology of this invention are described hereinafter with reference to the creation of an advertising medium in a recipe card file format and an integrated shopping list format. A system adapted for this purpose can have at least two (2) system master files, one such file containing a listing of generic ingredients organized in the form of recipes and certain other prescribed fields of classifications; and a second master systems file containing a corresponding listing of ingredients, by brand names and sponsor. Means are provided to retrieve data from each of these files, in response to sponsor input, to create brand name specific recipe files which can be targeted for a particular geographic region of the country; a particular time of the year (i.e. holiday season); seasonal availability of complementary ingredients (i.e. fresh fruits and vegetables, etc.); ethnic preferences; dietary preferences; and any combination of one or more of the above. The brand name specific recipe files prepared in the foregoing manner may be further modified by providing one or more additional files which list convenience foods by brand name that can be substituted for an individual recipe within a meal plan. This meal/recipe planning system can be further enhanced by providing additional fields within such files for pricing information and product location (routing) for each of individual products which are identified as ingredients by this meal planning and recipe selection system.

This system further comprises means for display and for entry of consumer selections from the brand name specific meal-recipe file. The consumer selection is to be based upon any one of a number of preselected criteria which are presented on the program main menu and sub-menus. In a typical embodiment of this invention, the display means depicts the available consumer choices on the program main menu (i.e. courses) and sub-menus (i.e. preferences), and the consumer simply enters his/her selection by means of activation of the appropriate key or by touching the display panel with his/or her finger or a stylus. The selections made by the consumer can be assembled (Interim Storage) in a meal plan or recipe format and, thereafter, entered (finalized) by similar activation means. At this juncture, the meal/recipe plan is reduced to a permanment record by suitable printing means, with the consumer receiving such output in at least two formats; the first being the traditional recipe file card format; and the second being an integrated shopping list identifying each of the items or ingredients he/she is required to purchase for implementation of meal/recipe plan. In both of the above formats, each of the ingredients, or convenience foods, which are needed for implementation of the meal-recipe plan are identified by the brand name of each of the sponsors of the products which are entered in the brand name specific recipe file. Where a product appears on the recipe or shopping list in generic form, it simply indicates that no brand name sponsor of that product has elected to participate in this advertising medium and, accordingly, provision is made for local modification of the master file to include store brands for products which do not have national or regional brand name sponsorship.

BRIEF DESCRIPTION OF THE DRAWINGS

FIG. 6 is an illustration of the novel advertising medium of this invention in a recipe file card format.

FIG. 8 is an illustration of the novel advertising medium of this invention in an integrated shopping list format.

DESCRIPTION OF THE INVENTION INCLUDING PREFERRED EMBODIMENTS

Figure 1:
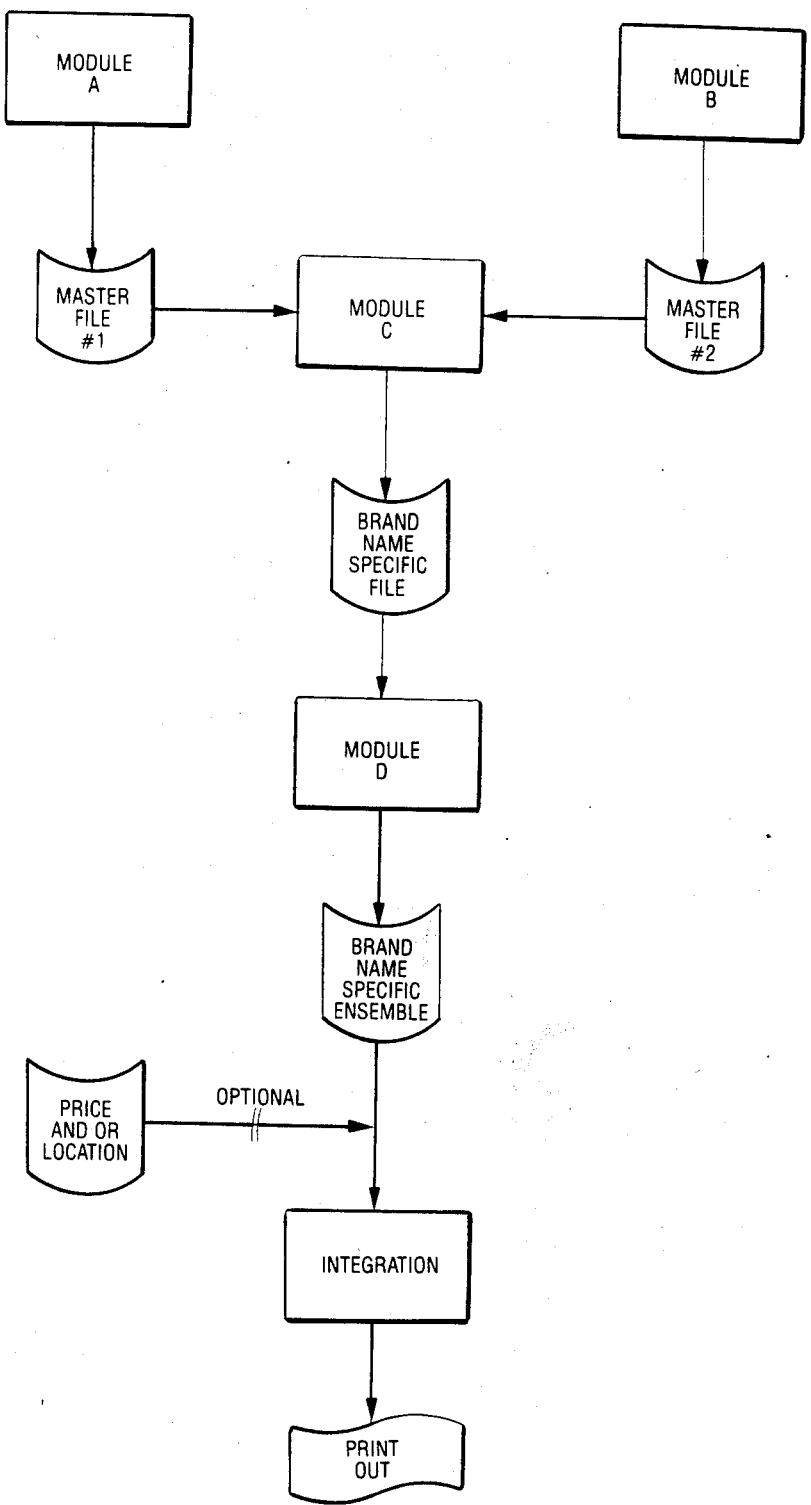
FIG. 1 represents a systems flow chart of the overall operation of the meal-recipe planning system of this invention.
Figure 2:
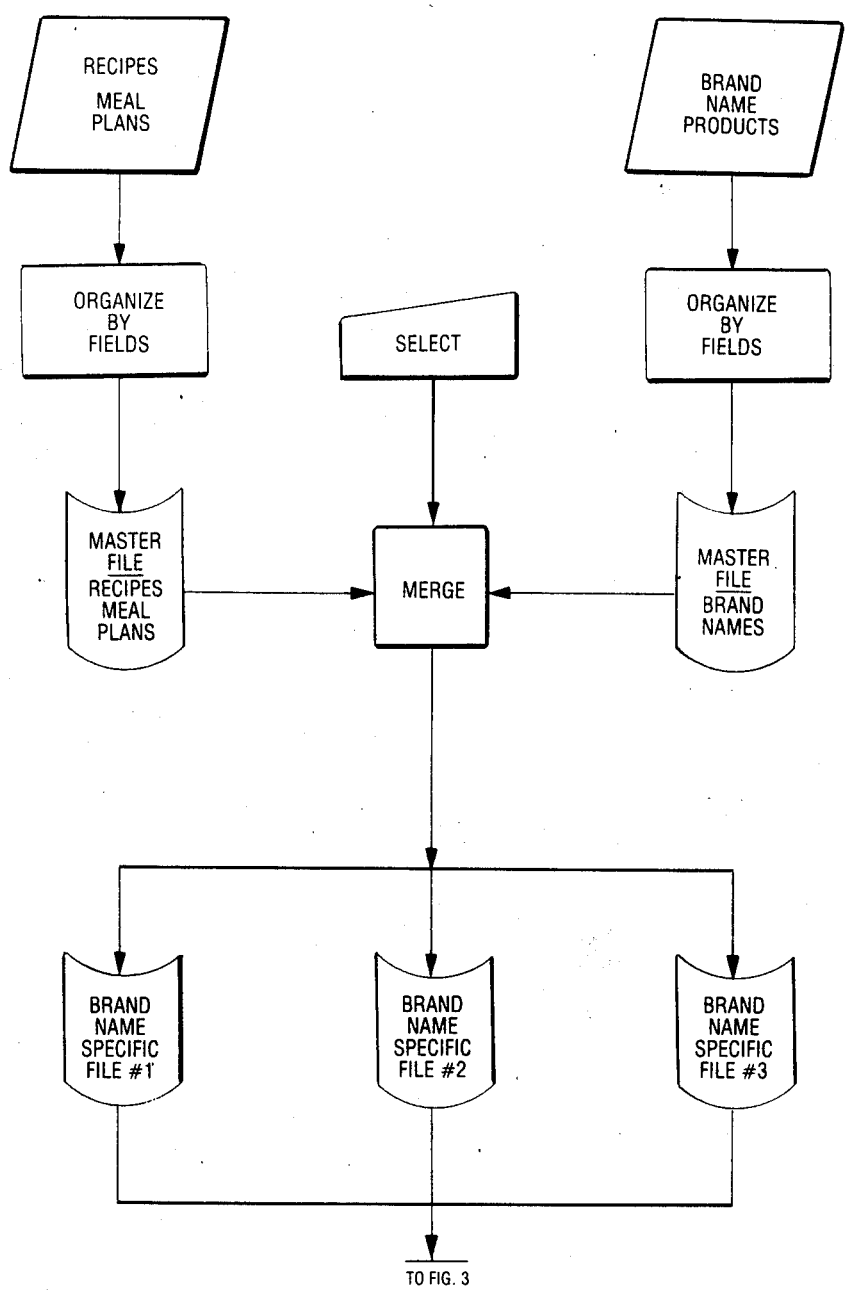
FIG. 2 represents a systems flow chart depicting the creation of brand name specific meal-recipe files in accordance with sponsor designated criteria.
Figure 3:
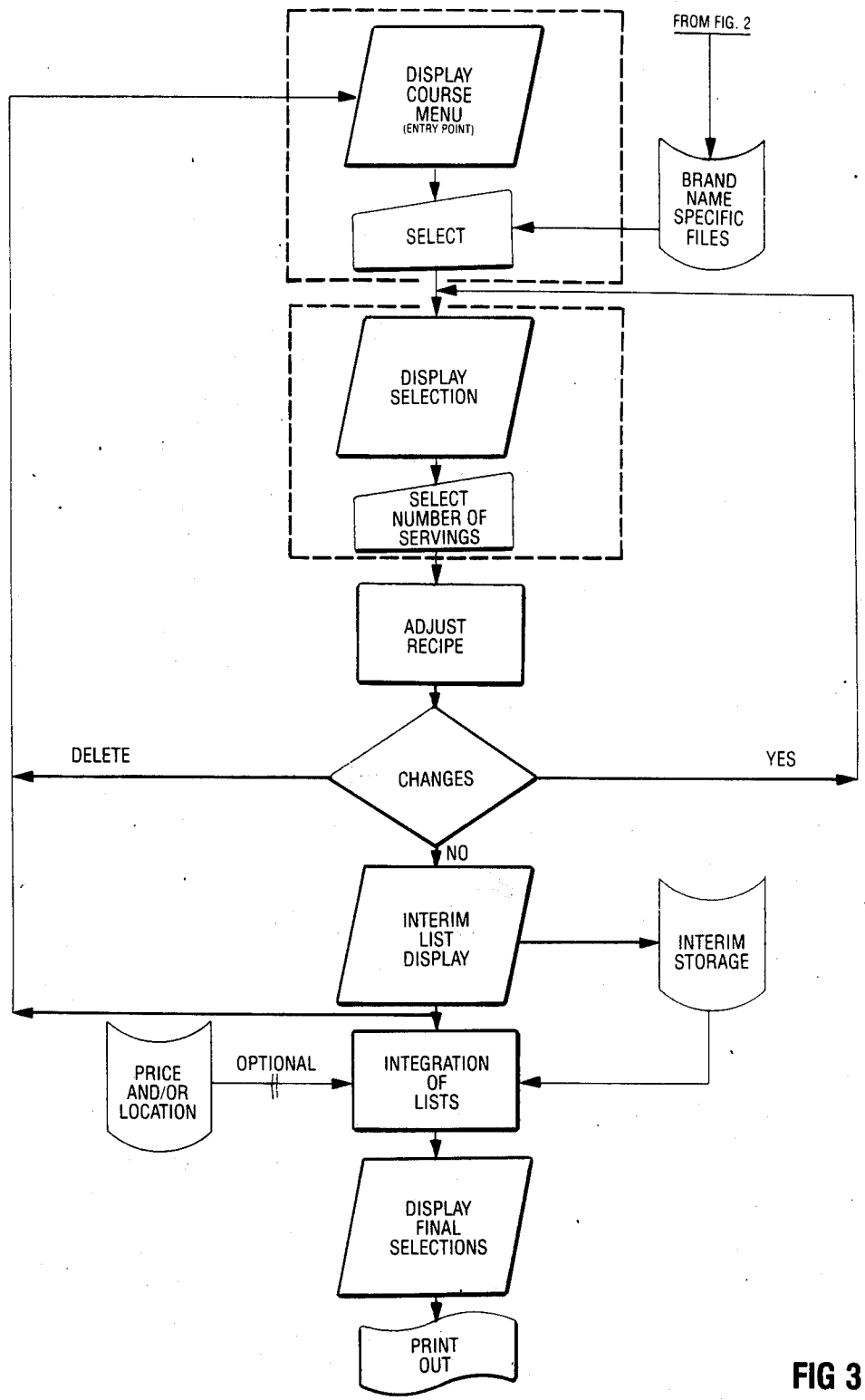
FIG. 3 represent a systems flow chart depicting the creation of meal-recipe plan in accordance with predetermined consumer designated criteria.

In the text of this application, the description of and reference to the various functional components of the systems flow diagrams of FIGS. 1-3, and to the illustration of FIGS. 4-8, employs the same descriptive terms as appear in these figures, hence the absence of reference numerals in the figures and in the text of this specification. The systems flow diagram of FIG. 1 illustrates the overall operation of the system and data processing methodology of this invention. Initially, at least two (2) system master files are assembled, in non-volatile memory (i.e. magnetic tape, floppy disc, etc.), from data input into Module A and Module B respectively. For the purposes of this illustration, System Master File #1 is characterized as the "generic file" and System Master File #2 is characterized as the "brand name file".

A "Generic Systems Master File", as that phrase is used in the context of this invention, shall mean a file containing a generic listing of various related goods and/or services organized in fields, which are or can be used in combinations with one another.

A "Brand Name Specific Systems Master File", as that term is used in the context of this invention, shall mean a file containing a corresponding listing of various related goods and/or services, organized in fields, which identifies such various goods and/or services by brand name and supplier (sponsor). The goods and/or services of the brand name systems master file are characterized by the same generic designation as is used in the generic systems master file.

The data contained in these systems master files is then merged by Module C in accordance with sponser selected criteria to produce an output file, entitled "Brand Name Specific File". This Brand Name Specific File is stored in a non-volatile memory and its composition is tailored to meet the sponsor's marketing objectives.

This Brand Name Specific File is designed for use by the consumer, in conjunction with Module D, to enable his/her composition of a brand name specific ensemble of related goods and/or services to meet his/her individualized needs. Module D is typically a consumer accessible computer terminal equipped with compatible applications software, that enables the consumer to select from among the various related goods and/or services in the Brand Name Specific File in any combination, and ultimately to obtain a hard copy of the selection in an integrated listing in any one of a number of formats.

The manner of operation of this system, as more fully illustrated in FIGS. 2 and 3, contemplates the individual selection of related goods and/or services one item at a time, the assembly of an interim listing, the editing of an interim listing and the display of an interim listing. All of these functions are simply combined in FIG. 1 is the boxes identified as "Module D" and "Integration". Once the final list has been composed, the consumer can request that the system provide a hard copy of his/her selections in the form of a Brand Name Specific Listing. The Brand Name Specific Listing can be arranged in any one of a series of formats depending upon the application software which is being used to run the system.

The flow diagram of FIG. 2 illustrates, in considerably greater detail than FIG. 1, the processing and assembling of data necessary in the generation of a meal-recipe and brand name specific system master files. The data input into one (1) of these system master files is typically in the form of mean plans and recipes. The ingredients of each of these recipes are simply identified by their common generic classification (i.e. salt, flour, shortening, etc.). This data is processed and organized in accordance with a file architecture which permits its later retrieval in a convenient and useable form. In the preferred embodiments of this invention, the meal plan and recipe information can be organized in fields by regional preference, seasonal preference, special occasions, ethnic preferences, nutritional preferences, dietary preferences, or seasonal availability of complementary ingredients and one or more combinations thereof. It is fully appreciated that other fields of organization are also possible in additional to or as alternatives to the ones referred to above.

A second master file is also prepared by creating a listing of ingredients by brand name and by sponsor of such brand name products. This data is processed and organized in accordance with a file architecture which permits its later retrieval in a convenient and useable form. As is readily understood, the input to this master file correspond, in part, to the meal-recipe system master file with respect to the use of a common generic term for a particular ingredient; and, with respect to the use of a common term for a particular recipe and for a precooked or prepared dish (i.e. pizza recipe and frozen pizza).

In the preferred embodiments of this invention, the aforementioned system master files can be conveniently organized by "relational data-based techniques" or "indexed sequential files ISAM" such as RMS 32, available on VAX VMS Computers and Operating Systems of Digital Equipment Corporation (Maynard, Mass.). This preferred file management technique permits the foregoing data to be readily organized and retrieved by one or more fields and in combinations of one or more fields. In the Appendix to this application, a description of the data bases for the systems master files is provided for the purpose of illustration for the various fields of organization of the recipe data, meal plan data, brand name data, quantity conversion data and recipe text data.

Once the proper data has been input and processed, the resultant master files can be merged by Module C into a Brand Name Specific Meal-Recipe File. The manner in which the data from the foregoing Master Files are merged in the creation these output files (Brand Name Specific Meal-Recipe Files) is tailored to meet the advertising objectives of the individual sponsors. For example, if a sponsor has a relatively complete and integrated product line used in the preparation of French cuisine, the Brand Name Specific Meal-Recipe File created for the promotion of his products will contain numerous French dishes which call for the largest number of brand name ingredients from the sponsor's product line. This Brand Name Specific Meal-Recipe File can be independently distributed for use in retail outlets or, combined with other brand name specific meal-recipe files from other sponsors. The combined package of Brand Name Specific Files from different sponsors would be composed in a manner to insure exclusive identification of a particular ingredient or, convenience food, by the sponsoring company.

In the creation of the Master Files for use in the apparatus and method of this invention, it is also contemplated that several ingredients would be included in the individual recipes which do not lend themselves to national, or even regional distribution. Accordingly, ample provision could thus be made to allow for introduction of store brands and other local items. One possible technique for introduction of local brands in the system would be to permit the creation of a separate Master File by the retailer, based upon the available (unsponsored) items remaining in the recipes. This Master File would permit the insertion of the local brand name from the previously unsponsored items.

The manner in which the data from the system master files of recipes is merged with the system master files of sponsors is based upon the independent input of the sponsor's requirements on Module C. These requirements are dictated by many of the same criteria used in the organization of the system master files (i.e. regional preferences, ethnic preferences, dietary preferences, etc.); and/or the specialized product line of the individual sponsors—the foregoing criteria hereinafter will be referred to as "sponsor advertising criteria". Accordingly, the creator of the brand name specific meal-recipe file will simply input the appropriate sponsor advertising criteria on Module C. This Module C would then merge the meal-recipe master file and brand name sponsor master file in accordance with sponsor advertising criteria.

The output produced as a result of the processing of this information from these various master files, in accordance with sponsor criteria, results in the generation of "Brand Name Specific Meal-Recipe Files". These Brand Name Specific Meal-Recipe Files can be distributed to local grocery chains and individual markets in any non-volatile, data retrievable form (i.e. floppy discs, ROMs, etc.) for the programming of stand alone consumer accessible terminals in their respective outlets. An alternative mode for composition of the Brand Name Specific Meal-Recipe Files would be to initially identify all the products of an individual sponsor and thereafter construct a meal-recipe system master file which would be oriented toward the use of as many products of the potential sponsor.

The system master file containing the meal plan and recipe information would, of course, have the capability of providing the potential sponsor with a listing of recipes containing ingredients which are included in his line of brand name products; and, permit the introduction of additional recipes into this systems master file to increase the frequency and visibility of products of an individual sponsor. Accordingly, the systems master file of meal plans and recipes would in all likelihood be composed of a number of independent sets of meal plans and recipes which could be more readily matched with an individual sponsor's product line. One such highly specialized systems master file of meal plans and recipes could be composed for the (a) gourmet; (b) camping consumer; or, (c) consumer planning a motoring trip. Thus, sponsors of consumer products suited for these specialized meal plans could more readily target their products to the potential customers and the consumer would be relieved of the burden of having to go through the laborious planning process of the identificaion of purchases which would be appropriate for his/her undertaking.

As noted hereinabove, consumer access to the Brand Name Specific Meal-Recipe File could be provided through terminals installed in markets or through a home terminal (hereinafter "consumer access terminal"). This consumer access terminal would preferably have features which would permit ease of use and be otherwise compatible with the merchandising environment of the retail outlet. In one of the preferred embodiments of this invention, the consumer access-terminal could be provided with a display for promoting pictorial information of an advertising nature when not in use.

Figure 4:
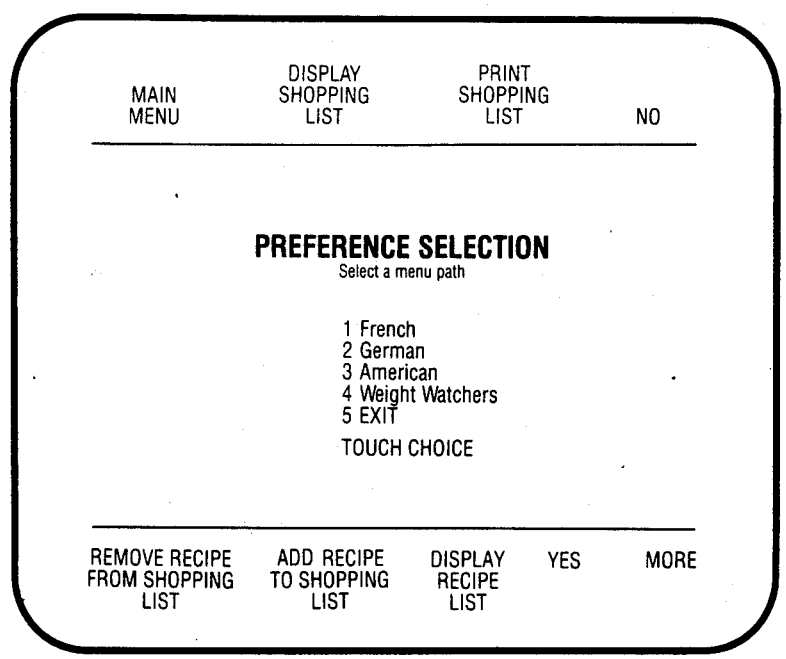
FIG. 4 depicts a display of a typical program main menu from which the consumer can select one or more paths (i.e. selection of courses).
Figure 5:
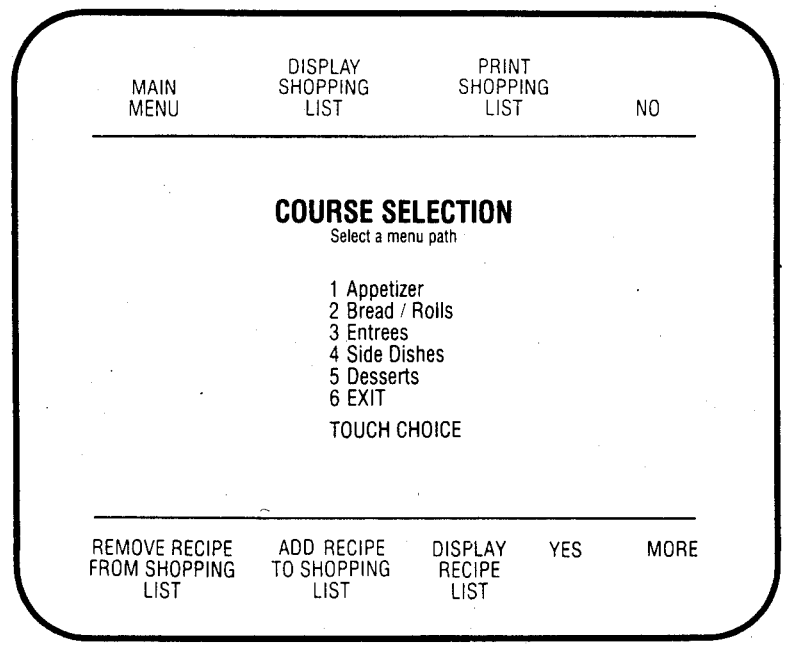
FIG. 5 depicts a display of a program sub-menu from which the consumer can select one or more paths (i.e. selection of preferences).
Figure 7:
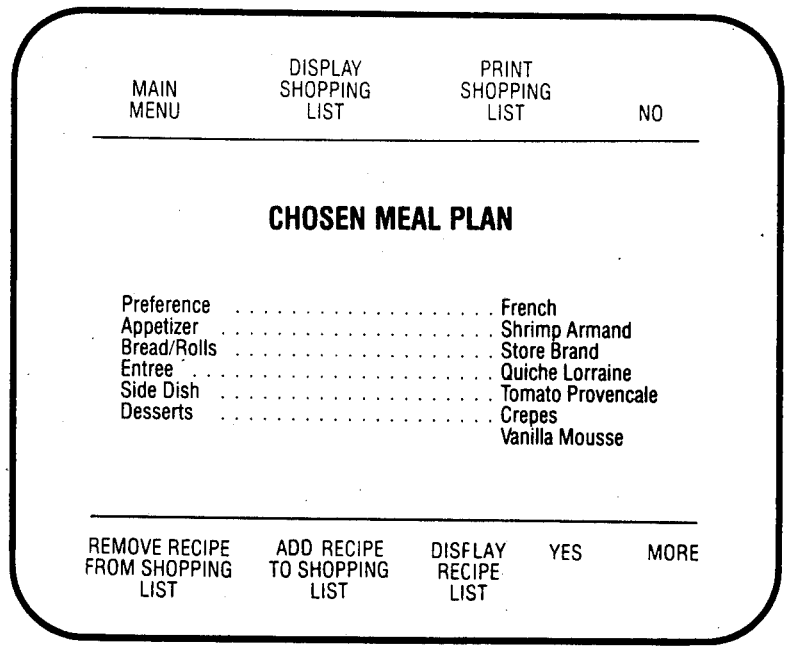
FIG. 7 depicts a display of a meal plan which has been assembled from individual choices selected by the consumer.

The system flow diagram of FIG. 3 illustrates the manipulation of the Brand Name Specific File(s) on Module D of FIG. 1. The process of consumer selection is preferably assisted by either visual and/or audible prompting cues from the terminal. Upon consumer activation of the program main menu, a series of choices would be presented. A representative program main menu is illustrated in FIG. 4. The consumer would thus be presented with a number of choices (menu paths) and, depending upon the selection entered, be directed either to a listing of individual recipes (i.e. courses) or to another more refined level of selection as illustrated in FIG. 5 (i.e. preference items, such as ethnic foods, holiday dishes, low calorie dishes, etc.). The individual recipes which are selected could be temporarily stored in the non-volatile system memory or work file (identified as "Interim Storage" of FIG. 3) while the consumer compiled additional recipes in the composition of the meal plan. When a specific recipe is selected, it is displayed on the monitor and the consumer allowed to briefly review its contents and method of preparation.

As illustrated in FIG. 6, this display would feature, in a recipe card format, the brand name products of the participating sponsor, for each of its products (ingredients) which is included in the recipe. The indivicual recipes selected can be scaled up or down depending upon the number of desired servings. After the consumer has composed his meal plan from the individually selected recipes (FIG. 7), a shopping list is compiled by the system and printed in a recipe file card and/or an integrated shopping list format (FIG. 8). The shopping list, illustrated in FIG. 8, not only indicates the number of individual items, by brand name, required to implement the meal plan, but also provides cumulative quantity totals so as to enable the consumer to purchase sufficient product to prepare all the recipes which have been selected. Where quantities of ingredients are expressed in terms of volume units of measure and sold in weight units of measure, the shopping list would express these cumulative totals in the units in which the product is sold. In one of the preferred embodiments of this invention illustrated in FIG. 8, the integrated shopping would identify with an asterick (*) those brand name products which are on "special", or for which coupons are available. In another of the preferred embodiments of this invention illustrated in FIG. 8, the integrated shopping list itself would have a series of coupons attached at the end of product listing. The issuance of coupons in this manner would help maintain better control over coupon fraud by providing a method for correlation of the site of issuance of the coupon and with the site of redemption. If, for example, a retail outlet's redemption of coupons exceeded its own distribution of the brand name product, the manufacturer would be able to more readily identify the source of such redemption abuse.

The configuration of hardware which can be used in the implementation of the method of this invention can be a free-standing personal computer console having at least one display element and at least one printer. In the context of the preferred enbodiments of this invention, the display element can also be capable of continuous display of pre-recorded pictorial advertising. The consumer selection of the meal-recipe planning information is preferably achieved by a combination of prompting commands which are entered via a touch screen of the type described in U.S. Pat. Nos. 3,860,754; 4,305,071; 4,053,773; 4,198,623; and 3,939,248—all of which are hereby incorporated by reference in their entirety. In the most preferred embodiments of this invention, the display element has a split screen which is capable of concurrent presentation of a pictorial illustration of the recipe selected on one portion of the display, while at the same time displaying, on another portion of the screen the textual portion of the recipe and its method of preparation. Upon consumer compilation of one or more recipes of a given meal plan, the consumer can request printing of the recipe and a shopping list. The information contained on the shopping list can include, in addition to an integrated listing of brand name and generic ingredients, the locaton of the individual ingredients in the market (preferably by aisle number and shelf location) and the price of each item in either the recommended, or the available, quantity. The total price of the shopping list could also be calculated in advance.

The following example provides an illustration of the creation of one specific meal plan and the method of execution thereof on the apparatus of this invention. The execution of this meal plan assumes the creation of appropriate brand name specific meal-recipe files for a sponsor specializing in French cuisine. The meal plan also presumes, for the purposes of this illustration, that all the courses in the meal plan can be prepared from individual recipes and at least one of the recipes can be substituted by a prepared (convenience) food.

The data processing methodology for the implementation of this meal-recipe plan is based upon the program listing and data base descriptions appearing in the Appendix to this disclosure. The program and data bases were developed in a Digital Equipment Corporation (DEC) VAX 11/750 equipped with (a) VMS operating system (V 3.x; (b) RMS-32 file management; (c) VAX-11 Basic (V 2.x); and (d) RTV, a proprietary data base system.

The appendable module RTVAPP5 is included in this program listing. Other utility programs that are part of the RTV package were used to populate the data base. In actual practice, these utilities programs would be replaced with custom programs to populate and maintain the data bases.

In the execution of this program, the consumer can select from among the available choices (i.e. courses) presented upon the program main menu illustrated in FIG. 4. The entry of the selection "Appetizers" cause the program to advance to a sub-menu containing a more refined level of selection (i.e. preferences). Upon indication of a preference for "French" food, the program will present those selections contained in the data bases which satisfy both of the foregoing criteria. Where only one of the items in the data base satisfies both of these criteria, it alone is presented for consumer consideration. If acceptable, the consumer simply indicates his selection by entry of the corresponding designation. The program will then display the ingredients of the entry and the method of preparation in a typical recipe file card format. Each of the individual items of the recipe are identified, as appropriate, with the brand name of the participating sponsor. The consumer can then elect to save or delete the selection, and proceed to the next choice.

Once a preference has been indicated for the initial selection, all other courses of the meal plan will follow this same preference. This selection process is repeated for Bread/Rolls; Entree; Side Dishes; and Desserts. In each instance, the individual items which have been selected have been stored in the non-volatile memory or work file (Interim Storage) of the system.

Upon completion of the meal planning session, the meal plan is combined and displayed as an Interim List to allow for confirmation of the choices by the consumer. The consumer, thus, has an additional opportunity to edit his selection before requesting printing of the integrated shopping list and individual recipe file cards.

The actual output of a representative recipe file card and integrated shopping list, which can be generated in the foregoing manner from the available choices contained in the data bases, is also included in the Appendix to this application.

The foregoing description of the system and data processing methodology for the creation of the unique advertising medium of this invention is provided as exemplary of a number of the preferred embodiments of this invention and not intended as delineating its scope. The scope of this invention is set forth in the claims which follow.

APPENDIX

PROGRAM LISTING..........................................A-1

DATA BASE DESCRIPTION....................................A-2

FRENCH MEAL PLAN, RECIPE CARD FILES & SHOPPING LIST......A-3

- A-1 -

```
     © Recipe Terminal Corporation 1984
2  !*****************************************************&
   !                                                      &
   ! SHOPPER      a program to demonstrate a brand name specific  &
   !              incorporation and ingredient merging methodology &
   !                                                      &
   !              This program and associated data files  &
   !              uses meal plannng and recipes subssytems &
   !              to demonstrate the brand name specific  &
   !              incorporation and merging into a shopping list &
   !                                                      &
   !              This program and data bases were developed on &
   !              a Digital Equipment Corporation (DEC)   &
   !              VAX 11/750 with VMS operating system  (V 3.x) &
   !                    RMS-32 File management           &
   !                    VAX-11 BASIC (V 2.x)             &
   !              and RTV, a propietary "data base" system. &
   !              The appendable module RTVAPP5 is included in &
   !              this program listing.  Other utility programs &
   !              that are part of the RTV package were used &
   !              to define and populate the databases.  &
   !              In actual practice these utilities would be &
   !              replaced with custom programs to populate and &
   !              maintain the databases                  &
   !*****************************************************&

3  !$$RTV print I%, z.string.bak(rO$(i%), zitem.decimal%(i%), zitem.out%(i%) &
   !       , zitem.type%(i%), zitem.pad%(i%), z.err% &
   !       for i%=1% to zx3%(0%,0%) &
   ! &
   ! I%=X% \ rO$(  i%) =z.store.str('data' &
   !                    , zitem.decimal%(i%), zitem.out%(i%) &
   !                    , zitem.type%(i%), zitem.pad%(i%), z.err% ) &

4       ! $$RTV &
        ! ********************************* &
        !                                   &
        ! RTVAPP5.bas                       &
        !                                   &
        !            Version 2              &
        !                                   &
        ! 5/24/84                           &
        !                                   &
        !            5 dbfs 0-4             &
        !                                   &
        ! ********************************* &
                                            &
           I%=0%    &
           \A%=0%   &
           \A$=''   &
           \I=0.    &

5    ! $$RTV &
     common (zzdate.user) &
     zserial%, zyear%, zmonth%, zday%, zyear.yy%, zjulian%, zleap% &
```

```
, zweek.day%, zholiday%, zusual.date%(10%) &
         &
         \ON ERROR GOTO 20000 !  DEFAULT ERROR HANDLER             &
         \ OPEN 'NL:' AS FILE 99% , RECORDSIZE 256%, MAP ZBUF       &
         \ MAP (ZBUF)    Z.Z.Z9$(7%)=1%,Z.Z.Z$=248%                 &
         \ ZPAD.CHANNEL% = 99%                                      &
         \ dim zchannel%(99%) &
         \ zchannel%(99%)=1% &
         \ GOSUB 25500                                              &
         \ EXTERNAL    STRING   FUNCTION   Z.CORE.COMMON.GET        &
         \ EXTERNAL    STRING   FUNCTION   Z.CORE.COMMON.GET.AUX    &
         \ EXTERNAL    STRING   FUNCTION   Z.CORE.COMMON.PUT        &
         \ EXTERNAL    STRING   FUNCTION   Z.CORE.CLEAR             &
         \ EXTERNAL    STRING   FUNCTION   Z.CHAIN                  &

6          EXTERNAL    REAL     FUNCTION   ZVALUE         ! $$RTV &
         \ EXTERNAL    STRING   FUNCTION   ZCVTS                    &
         \ EXTERNAL    LONG     FUNCTION   ZCVTP                    &
         \ EXTERNAL    STRING   FUNCTION   ZUSING.FLOAT             &
         \ EXTERNAL    STRING   FUNCTION   ZUSING.INT               &
         \ EXTERNAL    STRING   FUNCTION   ZS                       &
         \ EXTERNAL    STRING   FUNCTION   ZPAD                     &
         \ EXTERNAL    LONG     FUNCTION   ZRESUME                  &
         \ EXTERNAL    LONG     FUNCTION   ZIMOD                    &
         \ EXTERNAL    LONG     FUNCTION   ZIMOD1                   &
         \ EXTERNAL    LONG     FUNCTION   ZDELIMIT                 &
         \ EXTERNAL    LONG     FUNCTION   ZENCODE.DATE             &

7        DIM ZITEM.NAME$(000064%) ! $$RTV &
         ,   ZITEM.LEN%(000064%) &
         ,   ZITEM.TYPE%(000064%) &
         ,   ZITEM.DECIMAL%(000064%) &
         ,   ZITEM.POSITION%(000064%) &
         ,   ZNO.OF.KEYS%(000010%,7%) &
         ,   ZNO.OF.KEYS$(000010%,2%) &
         ,   ZLAST.RECORD$(000010%) &
         ,   ZNL.LAST.RECORD$(000010%) &
         ,   ZKEYS%(000085%,4%) &
         ,   ZITEM.PROT%(000064%) &
         ,   Z.BLOCK.RESUME.COUNT%(000010%,1%) &
             ,   ZSCORE%(000010%,3%) &
             ,   ZX3%(000010%,000064%) &
             ,   ZX3.65%(000010%) &
             ,   ZX2%(000010%,5%) &
             ,   ZDELIM%(000010%) &
             ,   ZOPSTAT%(000010%) &
             ,   ZNAME.THIS.CHANNEL$(000010%) &
             ,   ZMONTH$(24%), ZDAY$(7%) &
         \ DIM ZKEY.STUFF%(10%,8%,1%) &

8        DIM ZITEM.PAD%(000064%),           ! $$RTV &
             ZITEM.CUT%(000064%),           &
             ZITEM.VAX%(000064%),           &
             ZITEM.SUBS%(000064%)           &
             \external string function z.string.bak &
             \external string function z.store.str &

9        MAP (ZZ.Z0) STRING ZZ.ZZ.0=512%    ! $$RTV &
         \MAP (ZZ.Z1) STRING ZZ.ZZ.1=512%   &
         \MAP (ZZ.Z2) STRING ZZ.ZZ.2=512%   &
         \MAP (ZZ.Z3) STRING ZZ.ZZ.3=2048%  &
         \MAP (ZZ.Z4) STRING ZZ.ZZ.4=512%   &
         \MAP DYNAMIC (ZZ.Z0) R0$(64%) &
         \MAP DYNAMIC (ZZ.Z1) R1$(64%) &
         \MAP DYNAMIC (ZZ.Z2) R2$(64%) &
         \MAP DYNAMIC (ZZ.Z3) R3$(64%) &
         \MAP DYNAMIC (ZZ.Z4) R4$(64%) &

35 ! load [newrtv.dates]zimod
40       external long function zimod    &
             ! special modulus  function returns remainder and quotient &
```

```
400        dim save.receipe.line$ ( 100%, 6%)        ! save receipe line items &
                                                    ' for shopping list preparation &
           \dim temp.line$( 20%, 4%)                 ! save the line items for one &
                                                    ! receipe &
           \dim sort.temp$( 1%, 6%)                  ' used for sorting &

420        tot.fields% = 6%      ! highest column used in 400
600        data 5
610        DATA 'Appetizer','Bread / Rolls','Entrees','Side Dishes','Desserts'
620        read no.of.courses%
630        read course$(i%)      for i%=1% to no.of.courses%
650        data 4
660        data 'French','German','American','Weight Watchers'
670        read no.of.preferences%
680        read preference$(i%) for I% = 1% to no.of.preferences% &

700        screen.clear$   = chr$(12%)                 &
           \printer.home$  = chr$(12%)                 &
           \little.space$  = space$(10%)               ! ten char offset for choice &

710        open 'lpa0:' for output as file 1% &
           \chan%=1%
800        a%=fnq%(0%,'[shopper]mealplan.dbf') &
           \a%=fnq%(1%,'[shopper]receipe.dbf') &
           \a%=fnq%(2%,'[shopper]brandname.dbf') &
           \a%=fnq%(3%,'[shopper]rectext.dbf') &
           \a%=fnq%(4%,'[shopper]quanconv.dbf') &

1000       item$(i%)=course$(I%) for i%=1% to no of.courses% &
           \no.to.display%=no.of.courses% &
           \screen.title$ = 'COURSE' &
           \gosub 14000    &
           \goto 32767        if exit.flag% &
           !print clear.screen$ &
           \key$=item$(choice%) &
           \first.choice% = choice%    ! remember how we started &
           \item$(i%)=preference$(i%) for I%=1% to no.of.preferences% &
           \no.to.display%  = no.of.preferences% &
           \screen.title$ = 'PREFERENCE' &
           \gosub 14000 &
           \goto 1000       if exit.flag% &
           !key$=key$+','+item$(choice%) &
           \preference.this.session$ = item$(choice%)      ! we need it later &

1100       &
                  ! we have a preference  and we know the first choice &
           &
                  ! restart same choice list at 1130 if not like receipe &
                  ! selected &
                                &
                  ! loop to 1120 to index thru meal: &
                  ! Appetizer &
                  ! Bread / Rolls &
                  ! Entree &
                  ! etc &
           first.time.course.choice% = 0% &
           \ this.time.choice% = first.choice% &
           \ goto 1130 &

1110       meal.item% =  1% &

1120       meal.item%=meal.item% + 1% &
           \goto 2000      if meal.item% > 5%     ! we are done &
           \goto 1120      if meal.item%= first.choice%    ! we did this already &
           \this.time.choice% = meal.item% &
1130       this.key$ =  course$(this.time.choice%)+','+preference.this.session$ &
           \this.count% = 0% &
           \this.key% = 1% &
           \first.time.course.choice% = 1%   ! say we did the starting choice &
           \screen.title$ = course$(this.time.choice%)   ! screen title &
```

```
1140      a%=fnrx%(plan%,this.key%,this.key$,this.key$,0%) &
                    ! get all chances for this section &
          \stop if a%   ! disaster &
          \goto 1160    ! process it &

1150      a%=fnrx%(0%,this.key%,'','',1%)          ! follow this list till done &
          \goto 1200       if a%                    ! done no more this list &

1160      a%=fnz%(0%)              ! get the record into memory &
          \this.count%=this.count% + 1% &
          \sel.receipe$(this.count%)=rO$(5%)       ! get receipe number &
          \item$(this.count%) = rO$ (3%)           ! name of item &
          \goto 1150                               ! any more this section &

1200      no.to.display% = this.count% &
          \gosub 14000 &
          \goto 1000 if exit.flag% &

1210      ! now have receipe choice &
          ! get receipe # from sel.receipe$(choice%) and go on &

1220      receipe.no$=sel.receipe$(choice%)         &
          \display.receipe$ = item$(choice%)        ! for display &

1230      gosub 15000                               ! get and display receipe &
          \goto 1130 if try.again%                  ! didnt like this receipe &
                                                    ! try again &

1240      goto 1110                     ! now go get another part of the meal &
                    unless first.time.course.choice% &
          \goto 1120 if    first.time.course.choice% &

2000      &
                    ! reach here have a meal selected &
                    ! now sort by brand name ingredient code (thus by brand name &
                    !   specific ingredient &
                    ! then compress list combining quantities for same items &
                    ! from different receipes &

2010      field.to.sort% = 1%     ! sort by brand name ingredient code &
          \gosub 16000             ! sort them &
          \pack%=0%                ! get ready to pack them now &
          \quantity% = val ( save.receipe.line$(1%,0%)) &
                                   ! start with first quantity &

2020      for i%=2% to save.item% &
          \goto 2050       if save.receipe.line$(i%,1%) <> &
                              save.receipe.line$(i%-1%,1%) &

2030      quantity% = quantity% + val ( save.receipe.line$(i%,0%)) &
                              ! same br name ingr code add quan together &

2040      goto 2080               ! continue looping &

2050      pack%=pack%+1% &
          \save.receipe.line$(pack%,j%)=save.receipe.line$(i%-1%,j%) &
                      for j%=0% to tot.fields% &
          \save.receipe.line$(pack%,0%) = num1$ ( quantity% ) &
                      ! and the total quantity this br nm ingr code &
2060      quantity% = val (save.receipe.line$(i%,0%)) ! starting point &

2080      next i% &
                              ! now have packed list so that there arent &
                              ! any duplicate brand names in list &

2090      save.item% = pack%    ! readjust to reflect compressing list &

2100      &
                    ! now sort by store location &
```

```
2110     field.to.sort% =  3%    ! location in store &
         \gosub 16000             ! sort em &

2200     &
                 ! convert receipe quantities to selling quantitys &

2210     for i% = 1% to save.item% &
         \key$=save.receipe.line$( i% , 2% ) &
         \a%=fnrx%(4%, 0% , key$, key$ , 0%) &
         \ stop if a%      ! disaster &
         \a%= fnz%(4%)     ! &
                 ! now see if quantity needed exceeds the &
                 ! amount per selling quantity &
                 ! if so divide to get needed number &

2220     quan.to.print% = 1%    ! start with one          &
         \quan.needed% = val (save.receipe.line$ (i%,0%)) &
                                                          &
         \quan.per.selling.unit% = val( r4$(4%))           &
                                                          &
         \goto 2240    if quan.needed%  <= quan.per.selling.unit% &
                                                          &
\remain% =   zimod(quan.needed%,quan.per.selling.unit%,quan.to.print% )  &
                 ! use an external function to do a special modulus &
         \quan.to.print% =  quan.to.print% + 1% if remain% &

2240     save.receipe.line$( i% , 5% ) = num1$ ( quan.to.print% ) &
         \save.receipe.line$( i% , 6% ) = r4$(4%)   ! how sold 2 lb bag etc. &

2250     next i% &
                 ! now have quantity for brand name &

2300     &
                 ! and print shopping list &

2310     &
                 ! select the printer channel &
                 ! for this demo it is the same as the screen &
         &

2320     print #chan%,printer.home$ &
         \print #chan%,tab(20%); 'ROUTED SHOPPING LIST' &
         \print #chan% &
         \print #chan%,'Aisle','Quantity','Brand Name Specific Item' &
         \print #chan%,'-----','--------','------ ---- -------- ----' &
         \print #chan% &

2330     for this.item% = 1% to save.item% ! loop all items in list &

2340     print #chan%,save.receipe.line$(this.item%,3%), &
                     save.receipe.line$(this.item%,5%), &
                     save.receipe.line$(this.item%,4%)  &

2350     next this.item% &
2390     stop
14000    &
                 ! subroutine to display a choice screen &
         &
                 ! no.to.display%              # items to display    &
                 ! item$( )                    items to display      &
                 ! choice%                     what the user selected &
                 ! chan%                       system chan to i/o on &
                 ! exit.flag%                  user want to exit not choose &

14010           high.choice% = no.to.display% +1% ! for EXIT line &
                \exit.flag%=0%                    ! no say exit &

14020            print #chan%,screen.clear$              ! clear screen   &
                 \print #chan%,tab(30%);screen.title$    ! screen title &
                 \print #chan%,tab(30%);string$(len(screen.title$),45%) &
```

```
                \print #chan% &
                \print #chan% for i%=1% to 2%              ! some blank lines &
                \for i%=1% to no.to.display%              ! now display the lines &
                \print #chan%, little.space$;              ! some space &
                \print #chan%, i%, item$(i%)               ! the item &
                \print #chan%                              ! a blank line &
                \next i%                                   ! loop &

14030           print #chan%, little.space$;              ! some offset &
                \print #chan%, high.choice% ,  'EXIT'      ! and a way out &
                \print #chan% &

14040           print #chan% for I%=1% to 3%              ! &
                \print #chan%, '               CHOICE ';   ! prompt user &
                \input choice%                             ! &

14050           if choice% < 1% or choice% > high.choice% then 14020  ! retry &

14060           print #chan%, choice%     ! just for the demo echo it &

14070           exit.flag%=1% if choice% = high choice%   ! wants to exit &

14090           return                    ! we have a choice &

15000           &
                        ! get and display a receipe using receipe.no$ &
                &

15010   print #chan%, screen.clear$    ! clear screen &
        \print #chan% &
        \tabb% = (80% - len(display.receipe$))/2% &
        \print #chan%, tab(tabb%);display.receipe$ &
        \print #chan% &
        \temp item% =  0%                ! items this receipe &
        \try.again% =  0%       ! 0 kept this item <> 0 try again &

15020   a%=fnrx%(1%,0%,receipe.no$,receipe.no$,0%) &
        \stop if a% ! disaster receipe not on file &
        \goto 15050      ! got one go on &

15030   a%=fnrx%(1%,0%,'','',1%)          ! any more line items &
        \goto 15100      if a%            ! nope &

15050   a%=fnz%(1%)            ! get it in memory &
        \a%=fnrx%(2%,0%,r1$(6%),'',0%)   ! do an exact lookup on br nm code &
        \stop if a%     ! disaster &
        \a%=fnz%(2%)    ! get brand name specific data too &

15060           ! now have a receipe line item in r1$(),r2$() &
                ! now save selected fields and display it &
15070   temp.item%=temp.item%+1% &
        \temp.line$(temp.item%,0%) = r1$(3%)     ! save quanity &
        \temp.line$(temp.item%,1%) = r1$(6%)     ! br name code &
        \temp.line$(temp.item%,2%) = r1$(7%)     ! save conversion code &
        \temp.line$(temp.item%,3%) = r2$(6%)     ! save store location &
        \temp.line$(temp.item%,4%) = r2$(2%)     ! save brand name &

15080   print #chan%, ' '; &
        \print #chan%,r1$(3%);' ';                 ! receipe quantity &
        \print #chan%,r1$(4%);' ';                 ! measure &
        \print #chan%,r1$(5%);' ';                 ! prepared &
        \print #chan%,r2$(2%)                      ! and the brand name &

15090   goto 15030                                  ! next line item &

15100   &
                ! instructions ?? &
        &

15120   a%=fnrx%(3%,0%,receipe.no$,receipe.no$,0%) &
        \goto 15200      if a%   ! no instructions &
```

```
15130   print #chan%       &
        \print #chan%,'INSTRUCTIONS' &
        \print #chan% &

15150   a%=fnz%(3%)                     ! get the instructions &
        \for i%=2% to 21%               ! &
        \goto 15200 if r3$(i%)=''       ! first null line = done &
        \if r3$(i%)='*' then print #chan%   ! SINGLE star = print a blank &
                    else &
                        print #chan%,r3$(i%) ! non blank = print it &

15152   next i% &

15200   print #chan%            ! one blank line &
        \print #chan%,tab(25%); 'S-ave or E-xit <S> '; &
        \linput temp$       &
        \print #chan%,temp$             ! just for demo echo it &
        \temp$=edit$(temp$,-1%)         !squish to easy check form &
        \temp$='S' if temp$ = ''        ! user took the default &
        \goto 15300       if temp$='S'  ! save this receipe for shopping list &

15210   try.again% =   1% &
        \return                 ! tell caller user didnt like this receipe &

15300   &
                ! save this receipe &

15310   for I%=1% to temp.item%         ! loop all ingredients &

15320   save.item%=save.item%+1% &
        \save.receipe.line$(save.item%,0%) = temp.line$(i%,0%) &
        \save.receipe.line$(save.item%,1%) = temp.line$(i%,1%) &
        \save.receipe.line$(save.item%,2%) = temp.line$(i%,2%) &
        \save.receipe.line$(save.item%,3%) = temp.line$(i%,3%) &
        \save.receipe.line$(save.item%,4%) = temp.line$(i%,4%) &

15340   next i% &

15350   return &

16000   &
                ! sort routine to sort the save receipe.line$ array &
        &
16010     cnt%=save.item% &

16020   cnt%=cnt% - 1% &
        \return if cnt% < 1%  ! done go on back to caller &
        \we.made.switch% = 0% ! to tell if done early &

16030     for i%=1% to cnt%      &
        \if save.receipe.line$ ( i%      , field.to.sort% ) &
                        <= &
            save.receipe.line$ ( i%+1%  , field.to.sort% ) &
                  then 16060    &
                                &
            ! i%  item is less than or equal to i%+1% then still ordered &

16040     ! out of order bubble the bigger one up &
        \sort.temp$(1%,j%)=save.receipe.line$(i%,j%) &
                for j% = 0% to tot.fields% !save high in desired low position &
        \save.receipe.line$( i%, j%) = save.receipe.line$( i% + 1%, j%) &
                for j% = 0% to tot.fields%   ! &
        \save.receipe.line$( i%+1%, j%) = sort.temp$(1%,j%) &
                for j% = 0% to tot.fields% &
        \ we.made.switch% = 1%  ! signal need to keep going &

16060   next i% &
        \goto 16020     if we.made.switch% ! still moving around keep on &
        \return                             ! done &
```

```
20000 REM $$RTV$$  &
              !**** ERROR ROUTINES **** &

20001    IF ERL > 23999 THEN 24000 ! $$RTV$$ &

20010 REM   code user on error between 20011 and 23999   $$RTV$$ &

23999 GOTO 24999 ! $$RTV$$ &
           ! THE FINAL SOLUTION  &

24000 REM   POSSIBLE RTV APPENDABLE ERRORS GO HERE TO 24999   $$RTV$$ &

24999 Z.ERR%=ERR   ! $$RTV$$ &
      \Z.ERL%=ERL &
      \PRINT 'ERR #'; Z.ERR%; Z.ERL%; ERT$(Z.ERR) &
      \SLEEP 32767%+1% &
         \STOP &
         \GOTO 24999 &

25000   REM       $$RTV$$ &
           !              F U N C T I O N   S U M M A R Y           &
           !     RTV RECOMMENDED                    OLD STYLE       &
           ! FNQX%(ch%, dbf$, share%, resume%, name% )  fnq%(ch%, dbf$)       &
           ! FNRX%(ch%, key%, start$, end$, find/fol%)  fnr%(ch%, sel$, find/fol%) &
           ! FNRW%(ch%, key%, start$, end$, find/fol%)  ------------------------- &
           ! FNRS%(ch%, key%, start$, end$, find/fol%)  ------------------------- &
           ! FNZX%(ch%, read%)                      fnz%(ch%)           &
           ! FNPX%(ch%, function%, RESERVED%)       fnp%(ch%)           &
           ! FNUX%(ch%)                             ---------           &
           ! FNZCLOSE%                              gosub 29500         &
           ! FNZ1%(ch%, channel%)                   fnz1%(ch%, channel%) &
           ! FNZ2%                                  fnz2%                &
           !                                                             &
           ! FNZDRK$(ch%)                           ----------           &
           !                                                             &
           ! FNZRTV.ERR$ ( 'function', returned.err%, z.err%)            &

25010 REM             Auxiliary Functions                     $$RTV$$  &
           !                                                            &
           ! FNZCVT$(int%)                      cvt%$(int%)   long 4 byte  &
           ! FNZCVT%(string$)                   cvt$%(string$) no sort     &
           ! FNZS$(numeric$, length%)           "S" fields (DB/2)          &
           ! FNZPAD$(data$, pad$, length%)      pad left or right          &
           ! FNZUSING.FLOAT$(mask$, float)      print using no file        &
           ! FNZUSING.INT$(mask$, int%)         print using no file        &
           ! FNZVALUE(string$)      z.err% non zero if fail  val(string$)  &
           ! FNZRESUME%(ch%, resume%)  set locked block retry value        &
           !                                                               &
           !                                                               &
           ! FNZRTV.ERR$ ( 'function' , returned.error%, z.err% )          &
           ! error description thru the name  -- zert$  is  "global"       &

25020 REM             Auxiliary Functions                     $$RTV$$  &
           !                                                            &
           ! remainder% = ZIMOD ( int%, modulus%, quotient% )            &
           !            native mode                                      &
           !                                                             &
           ! remainder% = ZIMOD1( int%, modulus% )                       &
           !                                                             &
           ! success% = ZDELIMIT ( type%, input.string$, delimit$        &
           !                  , parse.array$( ), delimit.array%() )      &
           !                                                             &

25030 REM             Auxiliary Functions                     $$RTV$$  &
           ! success% = FNZDATE%( input.date$, date.type% )              &
           ! " globals " = standard set for input.date$                  &
           !                                                             &
           ! success% = FNZDATECONV1% ( input.date$, inp.date.type%      &
           !                       , bak.date.type% , offset%    )       &
           ! " globals " = zdate.bak$ , standard set for zdate.bak$      &
```

```
!   success% = FNZDATECONV2% ( first.date$   , first.date.form%            &
!                            , second.date$  , second.date.form% )         &
!  " globals " = zdate.diff%  standard set for second.date$                &
!                                                                          &
!   success% = FNZDATEBAK1% ( return.date.type% , year%, year.yy%          &
!                             month% , day% )                              &
!  " globals " = zdate.bak$   zserial%, zweekday%, zjulian% [, zholiday% ] &
!                                                                          &
!   success% = FNZDATEBAK2% ( return.date.type% , serial% )                &
!  " globals " = zdate.bak$   standard set for zdate.bak$                  &
!                                                                          &
!     standard set = zserial% , zyear%, zyear.yy%, zmonth%, zday%          &
!                    zweekday% , zjulian% [ , zholiday% ]                  &

25100    DEF* FNZRTV.ERR$ ( ZM9$, ZM9%, ZM8% ) ! $$RTV$$ &
         \CALL ZDATABASE.ERROR ( ZM9$, ZM9%, ZM8%, ZM8$, ZERT$ ) &
         \FNZRTV.ERR$ = ZM8$ &
         \FNEND &

25120    DEF* FNZITEM.CODE$ (ZM9%, ZM8%) ! $$RTV$$ &
         \CALL ZDATABASE.TYPE ( ZM9%, ZM8% , ZM9$, ZITEM.TEXT$ ) &
         \FNZITEM.CODE$=ZM9$ &
         \FNEND &

25220    DEF* FNZVALUE(ZM9$) ! $$RTV$$
         \FNZVALUE=ZVALUE(ZM9$, Z.ERR%) &
         \FNEND &

25230    DEF* FNZCVT%(ZM9$) ! $$RTV$$ &
         \FNZCVT%=ZCVTP(ZM9$, ZPAD.CHANNEL%) &
         \FNEND &

25240    DEF* FNZCVT$(ZM9%) ! $$RTV$$ &
         \FNZCVT$=ZCVTS(ZM9%, ZPAD.CHANNEL%) &
         \FNEND &

25250    DEF* FNZS$(ZM9$, ZM9%) ! $$RTV$$ &
         \FNZS$=ZS(ZM9$, ZM9%) &
         \FNEND &

25260    DEF* FNZPAD$(ZM9$, ZM8$, ZM9%) ! $$RTV$$ &
         \FNZPAD$=ZPAD(ZM9$, ZM8$, ZM9%) &
         \FNEND &

25270    DEF* FNZUSING.FLOAT$(ZM9$, ZM9) ! $$RTV$$ &
         \FNZUSING.FLOAT$=ZUSING.FLOAT(ZM9$, ZM9) &
         \FNEND &

25280    DEF* FNZUSING.INT$(ZM9$, ZM9%) ! $$RTV$$ &
         \FNZUSING.INT$=ZUSING.INT(ZM9$, ZM9%) &
         \FNEND &

25400    DEF* FNZDATE%(ZM9$, ZM9%) ! $$RTV$$ &
         \ZDATETYPE%=1% &
         \GOSUB 25480 &
         \FNZDATE%=Z.ERR% &
         \FNEND &

25410    DEF* FNZDATECONV1%(ZM9$, ZM9%, ZM8%, ZM7%) ! $$RTV$$ &
         \ZDATETYPE%=2% &
         \GOSUB 25480 &
         \FNZDATECONV1%=Z.ERR% &
         \FNEND &

25420    DEF* FNZDATECONV2%(ZM9$, ZM9%, ZDATE.BAK$, ZM8%, ZM7%) ! $$RTV$$ &
         \ZDATETYPE%=3% &
         \GOSUB 25480 &
         \FNZDATECONV2%=Z.ERR% &
         \ZDATE DIFF%=ZM7% &
         \FNEND &
```

```
25430   DEF* FNZDATEBAK1%(ZM9%,ZM8%,ZM7%,ZM6%,ZM4%) ! $$RTV$$ &
        \ZDATETYPE%=4% &
        \ZYEAR%=ZM8% \ ZMONTH%=ZM7% \ ZDAY%=ZM6% \ ZYEAR.YY%=ZM4% &
        \GOSUB 25490 &
        \FNZDATEBAK1%=Z.ERR% &
        !ZSERIAL%=ZM5% &
        \FNEND &

25440   DEF* FNZDATEBAK2%(ZM9%,ZM5%) ! $$RTV$$ &
        \ZDATETYPE%=5% &
        \ZSERIAL%=ZM5% &
        \GOSUB 25490 &
        \FNZDATEBAK2%=Z.ERR% &
        \FNEND &

25480   CALL ZDATECONV (ZDATETYPE%,ZM9$,ZM9%,ZDATE.BAK$,ZM8%,Z.ERR% ! $$RTV$$ &
                       ,ZMONTH$(),ZDAY$() &
                       ,ZM7% ) &
        \RETURN &

25490   CALL ZDATECONV (ZDATETYPE%,ZM9$,,ZDATE.BAK$,ZM9%,Z.ERR% ! $$RTV$$ &
                       ,ZMONTH$(),ZDAY$() &
                       ,ZM3% ) &
        \RETURN &

25500       ZCHNLSFREE%=000098%    ! $$RTV$$ &
        \ZLARGE%=INT(2.**31%-1%)
        \ZHIGH%=-ZLARGE% \ ZHIGH%=ZHIGH%-1% &
        \ZDB.MAX%=000009% ! NO OF DATABASES SUPPORTED &

25524   DIM ZSCALAR%(12%) ! $$RTV$$ &
        \ ZSCALAR%(0%)=0% &
        \ GOSUB 26900      &
        \ ZINIT%=ZSCALAR%(9%) &
        \ CALL ZDATABASEZ2 ( ZSCALAR%(),ZCHANNEL%(),ZNZ2%)  &
        \ ZHOLIDAY%(0%)=000060% &
        !PRINT '25524    ' &
      \ CALL ZDATEDEF   ( ZMONTH$( ),ZDAY$( ),ZNZ2%,Z.ERR%,zpad.channel% ) &
        \ CALL ZDATABASEZ1 (ZSCALAR%(),ZCHANNEL%(),-ZNZ2%,ZNZ1%) &
        \ GOTO 25550 IF Z.ERR% &
        !PRINT '25524 ZPAD ';ZPAD.CHANNEL% &
        \ call z.z.zdata.type.def &
        \ RETURN &

25550   PRINT 'cant initialize for ZDATE routines reason ';Z.err% ! $$RTV$$ &
        \STOP &

26100   DEF*    FNQ%(Z%,Z1$)       ! $$RTV$$ &
        \ZSCALAR%(0%)=1% &
        \GOSUB 26900      &
        \GOSUB 26148 UNLESS ZSCALAR%(1%) &
        \FNQ%=ZSCALAR%(1%) &
        \FNEND &

26110   DEF*    FNQX%(Z%,Z1$,Z1%,Z2%,Z3%)       ! $$RTV$$ &
        \ZSCALAR%(0%)=2%           &
        \GOSUB 26900      &
        \GOSUB 26148 UNLESS ZSCALAR%(1%) &
        \FNQX%=ZSCALAR%(1%) &
        \FNEND &

26148 ! $$RTV$$ &
        \ ZCHNL% = ZX2%(Z%,2%) &
        \ ZTEMP1%=0% &
        \ FOR ZTEMP%=1% TO ZX3%(Z%,0%) &
        \ ZTEMP2%=ABS(ZX3%(Z%,ZTEMP%)) &
        \ ON Z%+1% GOTO 26150 &
                 , 26151 &
                 , 26152 &
                 , 26153 &
                 , 26154 &
```

```
26150 ! $$RTV$$ &
          REMAP (ZZ.Z0) &
                  FILL$      =ZTEMP1% &
                            ,R0$(ZTEMP%)=ZTEMP2% &
          \ GOTO 26198 &

26151 ! $$RTV$$ &
          REMAP (ZZ.Z1) &
                  FILL$      =ZTEMP1% &
                            ,R1$(ZTEMP%)=ZTEMP2% &
          \ GOTO 26198 &

26152 ! $$RTV$$ &
          REMAP (ZZ.Z2) &
                  FILL$      =ZTEMP1% &
                            ,R2$(ZTEMP%)=ZTEMP2% &
          \ GOTO 26198 &

26153 ! $$RTV$$ &
          REMAP (ZZ.Z3) &
                  FILL$      =ZTEMP1% &
                            ,R3$(ZTEMP%)=ZTEMP2% &
          \ GOTO 26198 &

26154 ! $$RTV$$ &
          REMAP (ZZ.Z4) &
                  FILL$      =ZTEMP1% &
                            ,R4$(ZTEMP%)=ZTEMP2% &
          \ GOTO 26198 &

26198 ! $$RTV$$ &
          ZTEMP1%=ZTEMP1% + ZTEMP2% &
                !ACCUMULATE OFFSET TO NEXT FIELD &
          \ NEXT ZTEMP% &
                !DO NEXT FIELD &
          \ RETURN &

26200    DEF* FNR%(Z%,Z1$,Z2%) ! $$RTV$$ &
         \ZSCALAR%(0%)=1% &
         \GOSUB 26290 &
         \FNR%=ZSCALAR%(1%) &
         \FNEND &

26210    DEF* FNRX%(Z%,Z1%,Z1$,Z2$,Z2%) ! $$RTV$$ &
         \ZSCALAR%(0%)=2% &
         \GOSUB 26290 &
         \FNRX%=ZSCALAR%(1%) &
         \FNEND &

26220    DEF* FNRW%(Z%,Z1%,Z1$,Z2$,Z2%) ! $$RTV$$ &
         \ZSCALAR%(0%)=3% &
         \GOSUB 26290 &
         \FNRW%=ZSCALAR%(1%) &
         \FNEND &

26290    CALL ZDATABASERX(ZSCALAR%(),Z1$,Z2$,Z%,Z1%,Z2%,ZPASSW2$ ! $$RTV$$ &
         , ZNO.OF.KEYS%(,),ZNO.OF.KEYS$(,),ZLAST.RECORD$() &
         ,Z.BLOCK.RESUME.COUNT%(,),ZX2%(,),ZDELIM%(),ZOPSTAT%() &
         ,ZKEY.STUFF%(,,),ZNO.DRK%()   &
         ,ZKEYS%(,),zx3.65%() &
         ,ZCHANNEL%() ) &
         \W2$=ZPASSW2$ &
         !ZSCALAR%(1%)=-999% IF ZSCALAR%(1%) <> 0% &
         \RETURN &

26300    DEF* FNP%(Z%) ! $$RTV$$ &
         \Z1%=1% &
         \Z2%=0% &
         \GOSUB 26390 &
         \FNP%=ZSCALAR%(1%) &
         \FNEND &
```

```
26310    DEF* FNPX%(Z%,Z1%,Z2%) ! $$RTV$$ &
         \GOSUB 26390 &
         \FNPX%=ZSCALAR%(1%) &
         \FNEND &

26390    CALL ZDATABASEP(ZSCALAR%(),Z%,Z1%,Z2%,ZOPSTAT%(),ZX2%(,) ! $$RTV$$ &
         ,ZX3.65%(),ZSCORE%(,),ZNO.DRK%(),ZNL.LAST.RECORD$() &
         ,ZLAST.RECORD$(),Z.BLOCK.RESUME.COUNT%(,) &
         ,ZKEY.STUFF%(,,) ) &
         \RETURN &

26400    DEF* FNZ%(Z%) ! $$RTV$$ &
         \Z1%=0% &
         \GOSUB 26490 &
         \FNZ%=ZSCALAR%(1%) &
         \FNEND &

26410    DEF* FNZX%(Z%,Z1%) ! $$RTV$$ &
         \CALL ZDATABASEZ(ZSCALAR%(),Z%,Z1%,ZX2%(,),ZOPSTAT%() &
         ,ZNL.LAST.RECORD$(),ZLAST.RECORD$() ) &
         \FNZX%=ZSCALAR%(1%) &
         \FNEND &

26490    CALL ZDATABASEZ(ZSCALAR%(),Z%,Z1%,ZX2%(,),ZOPSTAT%() ! $$RTV$$ &
         ,ZNL.LAST.RECORD$(),ZLAST.RECORD$() ) &
         \RETURN &

26500    DEF* FNUX%(Z%) ! $$RTV$$ &
         \CALL ZDATABASEU(ZSCALAR%(),ZOPSTAT%(),ZX2%(,),Z%,ZNUX%) &
         \FNUX%=ZNUX% &
         \FNEND &

26510    DEF* FNZCLOSE% ! $$RTV$$ &
         \ZSCALAR%(0%)=3% &
         \GOSUB 26900 &
         \FNZCLOSE%=ZSCALAR%(1%) &
         \FNEND &

26530    DEF* FNZ1%(Z%) ! $$RTV$$ &
         \CALL ZDATABASEZ1(ZSCALAR%(),ZCHANNEL%(),Z%,ZNZ1%)
         \FNZ1%=ZNZ1% &
         \ZCHNLSFREE%=ZSCALAR%(4%) &
         \FNEND &

26540    DEF* FNZ2% ! $$RTV$$ &
         \CALL ZDATABASEZ2(ZSCALAR%(),ZCHANNEL%(),ZNZ2%) &
         \FNZ2%=ZNZ2% &
         \ZCHNLSFREE%=ZSCALAR%(4%) &
         \FNEND &

26550    DEF* FNZRESUME%(Z%,Z1%) ! $$RTV$$ &
         \CALL ZRESUME (Z%,Z1%,Z.BLOCK.RESUME.COUNT%(,) ) &
         \FNZRESUME%=0% &
         \FNEND &

26600    DEF* FNZDRK$(Z%)          ! $$RTV$$ &
         \CALL    ZDATABASEKEY ( ZSCALAR%(),Z%,ZNO.DRK%(),ZX2%(,),ZX3.65%() &
                                ,ZKEY.STUFF%(,,) &
                                ,ZOPSTAT%() &
                                ,ZPASSW2$ ) &
         \FNZDRK$=ZPASSW2$ &
         \FNEND &

26900    ZSCALAR%(3%)      = ZDB.MAX%        ! $$RTV$$ &
         \ZSCALAR%(4%)     = ZCHNLSFREE% &
         \ZSCALAR%(6%)     = ZLAST.DBF.KEY% &
         \ZSCALAR%(7%)     = ZKEY.LEN% &
         \ZSCALAR%(8%)     = ZNO.OF.USERS% &
         \ZSCALAR%(9%)     = ZINIT% &
         \ZSCALAR%(10%)    = ZPAD.CHANNEL% &
```

```
26903 CALL ZDATABASE (ZSCALAR%(),Z1$,Z2$,Z%,Z1%,Z2%,Z3%,Z5%,ZPASSW2$ !$$RTV$$ &
     ,    ZITEM.NAME$(         ) &
     ,    ZITEM.LEN%(          ) &
     ,    ZITEM.TYPE%(         ) &
     ,    ZITEM.DECIMAL%(         ) &
     , ZITEM.POSITION%( ),ZITEM.PAD%(),ZITEM.OUT%(),ZITEM.VAX%(),ZITEM.SUBS%() &
     ,    ZNO.OF.KEYS%(   ,    ) &
     ,    ZNO.OF.KEYS$(   ,    ) &
     ,    ZLAST.RECORD$(       ) &
     ,    ZNL.LAST.RECORD$(      ) &
     ,    ZITEM.PROT%(      ) &
     ,    Z.BLOCK.RESUME.COUNT%(     ,  ) &
     ,    ZSCORE%(       ,   ) &
         , ZX2%(         ,   ) &
         , ZX3.65%(      )    &
         , ZX3%(,) &
         , ZDELIM%() &
         , ZOPSTAT%() &
         , ZNAME.THIS.CHANNEL$() &
         , ZKEY.STUFF%(,,) &
         , ZNO.DRK%() &
         , zkeys%( , ) &
         , ZCHANNEL%( ) ) &

26910    Z.ERR%         = ZSCALAR%(2%) ! $$RTV$$ &
        \ZDB.MAX%       = ZSCALAR%(3%) &
        \ZCHNLSFREE%    = ZSCALAR%(4%) &
        \ZLAST.DBF.KEY% = ZSCALAR%(6%) &
        \ZKEY.LEN%      = ZSCALAR%(7%) &
        \ZNO.OF.USERS%  = ZSCALAR%(8%) &
        \ZPAD.CHANNEL%  = ZSCALAR%(10%) &
        \RETURN &

29500   ZM9%=FNZCLOSE% ! $$RTV$$ &
        \RETURN &

32767   END    ! $$RTV$$ &
```

- A-2 -

D A T A   B A S E   D E S C R I P T I O N    13-Jun-84 11:04 AM description DMA1:[SHOPPER]MEALPLAN.DBF;5  version = 2
data        DMA1:[SHOPPER]MEALPLAN.IND

| Field | Field name | Info Name | Type |   | Length |    |   |    |    |
|-------|------------|-----------|------|---|--------|----|---|----|----|
| 1 | preference | preference | A | C | 20 | 1  | 4 | 20 | -1 |
| 2 | course     | course     | A | C | 20 | 21 | 4 | 20 | -1 |
| 3 | name       | name       | A | C | 30 | 41 | 4 | 30 | -1 |
| 4 | servings   | servings   | A | C | 3  | 71 | 4 | 3  | -1 |
| 5 | receipe #  | receipe_#  | A | C | 5  | 74 | 4 | 5  | -1 | number of fields   5
         record length      78

---

K E Y   I N F O R M A T I O N key separator ("comma") character ascii (decimal)= 44 character=","

key length   field number(s) in key
             field names
             key name   (NOTE this is NOT a file name)

---

0    70     1 , 2 , 3
              /preference/course/name/
              primary key

```
1    40      2 , 1
             /course/preference/
             course - preference 2    50      2 , 3
             /course/name/
             course - name 3    30      3
             /name/
             name
``` description DMA1:[SHOPPER]QUANCONV.DBF;4  version = 2
data        DMA1:[SHOPPER]QUANCONV.IND

| Field | Field name | Info Name | Type | | Length | |
|---|---|---|---|---|---|---|
| 1 | conv code | conv_code | S | V | 3 | 1 |
| | 4  3 -1 | | | | | |
| 2 | receipe quan units | receipe_quan_uni | A | C | 6 | 4 |
| | 4  6 -1 | | | | | |
| 3 | selling quan units | selling_quan_uni | A | C | 15 | 10 |
| | 4 15 -1 | | | | | |
| 4 | receipe quan per selling quan | receipe_quan_per | A | C | 7 | 25 |
| | 4  7 -1 | | | | | |

```
             number of fields     4
             record length       31
```

KEY INFORMATION key separator ("comma") character ascii (decimal)= 44 character=","

key length   field number(s) in key
             field names
             key name   (NOTE this is NOT a file name)

```
    0    3      1
                /conv_code/
                primary key conv code
``` description DMA1:[SHOPPER]RECTEXT.DBF;2  version = 2
data        DMA1:[SHOPPER]rectext.IND

| Field | Field name | Info Name | Type | | Length | | | | |
|---|---|---|---|---|---|---|---|---|---|
| 1 | receipe # | receipe_# | A | C | 5 | 1 | 4 | 5 | -1 |
| 2 | text 1 | text_1 | A | C | 50 | 6 | 4 | 50 | -1 |
| 3 | text 2 | text_2 | A | C | 50 | 56 | 4 | 50 | -1 |
| 4 | text 3 | text_3 | A | C | 50 | 106 | 4 | 50 | -1 |
| 5 | text 4 | text_4 | A | C | 50 | 156 | 4 | 50 | -1 |
| 6 | text 5 | text_5 | A | C | 50 | 206 | 4 | 50 | -1 |
| 7 | text 6 | text_6 | A | C | 50 | 256 | 4 | 50 | -1 |
| 8 | text 7 | text_7 | A | C | 50 | 306 | 4 | 50 | -1 |
| 9 | text 8 | text_8 | A | C | 50 | 356 | 4 | 50 | -1 |
| 10 | text 9 | text_9 | A | C | 50 | 406 | 4 | 50 | -1 |
| 11 | text 10 | text_10 | A | C | 50 | 456 | 4 | 50 | -1 |
| 12 | text 11 | text_11 | A | C | 50 | 506 | 4 | 50 | -1 |
| 13 | text 12 | text_12 | A | C | 50 | 556 | 4 | 50 | -1 |
| 14 | text 13 | text_13 | A | C | 50 | 606 | 4 | 50 | -1 |
| 15 | text 14 | text_14 | A | C | 50 | 656 | 4 | 50 | -1 |
| 16 | text 15 | text_15 | A | C | 50 | 706 | 4 | 50 | -1 |
| 17 | text 16 | text_16 | A | C | 50 | 756 | 4 | 50 | -1 |
| 18 | text 17 | text_17 | A | C | 50 | 806 | 4 | 50 | -1 |
| 19 | text 18 | text_18 | A | C | 50 | 856 | 4 | 50 | -1 |

```
 20    text 19      text_19              A   C    50   906    4  50 -1
 21    text 20      text_20              A   C    50   956    4  50 -1 number of fields    21
              record length     1005
```

---

KEY INFORMATION key separator ("comma") character ascii (decimal)= 44 character=","

key length  field number(s) in key
            field names
            key name  (NOTE this is NOT a file name)

---

```
  0    5      1
              /receipe_#/
              receipe #
``` description DMA1:[SHOPPER]RECEIPE.DBF;6  version = 2
data        DMA1:[SHOPPER]RECEIPE.IND

```
Field  Field name                 Info Name            Type       Length 1    receipe #                  receipe_#            A   C    5    1    4
5 -1
  2    seq #                      seq_#                S   V    2    6    4
2 -1
  3    receipe quan               receipe_quan         A   C    5    8    4
5 -1
  4    measure                    measure              A   C    6   13    4
6 -1
  5    prepared                   prepared             A   C   15   19    4
15 -1
  6    brand name ingredient code brand_name_ingre     A   C    6   34    4
6 -1
  7    receipe quan conv code     receipe_quan_con     S   V    3   40    4
3 -1 number of fields     7
              record length       42
```

---

KEY INFORMATION key separator ("comma") character ascii (decimal)= 44 character=","

key length  field number(s) in key
            field names
            key name  (NOTE this is NOT a file name)

---

```
  0    7      1 , 2
              /receipe_#/seq_#/
              primary key receipe - seq
``` description DMA1:[SHOPPER]BRANDNAME.DBF;7  version = 2
data        DMA1:[SHOPPER]BRANDNAME.IND

```
Field  Field name                 Info Name            Type       Length 1    brand name ingredient code brand_name_ingre     A   C    6    1    4
6 -1
  2    brand name ingredient      brand_name_ingre     A   C   30    7    4
```

```
30 -1
  3    generic                     generic              A    C    15   37   4
15 -1
  4    manufacturer                manufacturer         A    C    35   52   4
35 -1
  5    coupon code                 coupon_code          A    C     5   87   4
 5 -1
  6    store location              store_location       A    C     2   92   4
 2 -1 number of fields    6
        record length      93
```

---

KEY INFORMATION key separator ("comma") character ascii (decimal)= 44 character=","

```
key length   field number(s) in key
             field names
             key name   (NOTE this is NOT a file name)
```

---

```
0    6      1
            /brand_name_ingre/
            primary key ingr code 1    15     3
            /generic/
            generic 2    35     4
            /manufacturer/
            manufacturer 3    30     2
            /brand_name_ingre/
            brand name ingredient 4    40     5 , 4
            /coupon_code/manufacturer/
            coupon code,manufacturer 5    8      6 , 1
            /store_location/brand_name_ingre/
```

- A-3 -

COURSE

1  Appetizer

2  Bread / Rolls

3  Entrees

4  Side Dishes

5  Desserts

6  EXIT

CHOICE  1

PREFERENCE
----------

1   French

2   German

3   American

4   Weight Watchers

5   EXIT

CHOICE  1
                Appetizer
                ---------

1   Shrimp Armand

2   EXIT

CHOICE  1

Shrimp Armand

| 1    | bag   | frozen  | Highliner Froz. Shrimp 8oz.    |
| 0.25 | cup   |         | Dukes Peanut Oil 32 oz.        |
| 0.25 | cup   | white   | Musselman's White Vinegar 16oz |
| 1    | Tbl   | chopped | McCormick Chopped Chive 0.12oz |
| 1    | Tbl   |         | Crystal Chili Sauce 6oz        |
| 2    | tsp   | Hot     | Gulden's Hot Mustard 8oz       |
| 1    | clove |         | Spice World Garlic 2 oz        |
| 0.25 | tsp   |         | McCormick Paprika 1.75 oz      |

INSTRUCTIONS

Cook bag of shrimp (1 lb. 5 oz.) according to
package directions. Drain and cool.

Combine oil, white vinegar, chives, chili sauce,
hot mustard, garlic, and salt. Add cooled shrimp;
toss well.

Cover and refrigerate at least 3 hours, tossing
occasionally.

To serve, drain, sprinkle lightly with paprika.

S-ave or E-xit <S> s
               Bread / Rolls
               -------------

1   Store Brand

2   Pillsbury   P&F

3   EXIT

CHOICE  1

```
                              Store Brand 1       bag        frozen           Publix Bakery Bread S-ave or E-xit <S> s Entrees
                    -------
1   Duck L'Orange 2   Quiche Loraine

3   EXIT
    CHOICE  2

Quiche Loraine 9       cooked slices       Oscar Meyer Bacon 8oz
    9                           Publix Premium Grade Eggs
    2.5     CUP     shredded    Shredded Swiss Cheese 8oz
    0.5     tsp                 Morton Iodized Salt
    0.25    cup     minced      Lawry's Minced Onion 3.75oz
    0.25    tsp                 Dixie Crystal Sugar 32oz.
    1       dash                Spice Island Cayenne 0.39oz
    1       Deep    Frozen      Pet Ritz Frozen Pie Shell 12oz

INSTRUCTIONS

Sprinkle bacon, cheese, and onion in bottom of
frozen pie shell.  Beat together eggs, cream, and
seasonings.  Pour egg mixture into pie shell.

Bake in preheated 425 degree oven for 15 minutes
on bottom shelf.  Reduce temperature to
325 degrees and continue baking 20 minutes or till
knife inserted comes out clean.

Let stand for 10 minutes before cutting.

S-ave or E-xit <S> s
                    Side Dishes
                    -----------
1   Tomato Provencale

2   EXIT
    CHOICE  1

Tomato Provencale

2       Can                 Hunt Tomatoes 15 oz
    1       Tbl     chopped     McCormick Parsley
    2       Tbl                 Progresso Bread Crumbs
    1       Tbl                 Pompeian Olive Oil 4 oz
    0.25    tsp                 Morton Iodized Salt
    1       clove   crushed     Spice World Garlic 2 oz

INSTRUCTIONS

Cut tomatoes in half crosswise and remove seeds.

Heat oil in skillet and saute tomatoes, cut side
down, about 3 minutes.  Turn and sprinkle with
salt and pepper, saute 3 more minutes.

Add garlic and saute till tomatoes are tender.
Place tomatoes on a heated serving dish and
sprinkle with parsley.

Toast the bread crumbs in a skillet till golden,
and sprinkle over the tomatoes.

S-ave or E-xit <S>
```

Desserts

1 Crepes

2 Vanilla Mousse

3 EXIT

CHOICE  1

Crepes

| | | | |
|---|---|---|---|
| 1.5 | cups | all-purpose | M. White All Purp. Flour 2lb |
| 0.5 | tsp | | Calumet Bake Powder 7oz. |
| 0.5 | tsp | | Morton Iodized Salt |
| 1 | Tbl | | Dixie Crystal Sugar 32oz. |
| 2 | cups | | Milk |
| 3 | | | Publix Premium Grade Eggs |
| 0.5 | tsp | | McCormick Vanilla 2oz. |
| 2 | Tbl | | Land-o-Lakes Butter 1lb |

INSTRUCTIONS

Mix flour, sugar, baking powder, and salt together in a bowl. Stir in remaining ingredients. Beat mixture until smooth.

Heat butter in a skillet until bubbly. Pour 1/2 c. of batter in and rotate pan so that batter spreads evenly.

Cook till light brown. Turn and brown other side.

Spread almost anything on crepes and roll up. Sprinkle with sugar.

S-ave or E-xit <S> E

Desserts

1 Crepes

2 Vanilla Mousse

3 EXIT

CHOICE  2

Vanilla Mousse

| | | | |
|---|---|---|---|
| 4 | | | Publix Premium Grade Eggs |
| 0.5 | cup | powdered | Dixie Crystal Powder Sugar 1lb |
| 1 | pint | | Sealtest Heavy Cream 1 pint |
| 1 | tsp | | McCormick Vanilla 2oz. |

INSTRUCTIONS

Separate eggs. Beat egg whites till stiff. Beat in 1/4 c. sugar and set aside.

Whip cream, remaining sugar and vanilla until thick.

Fold in egg whites. Pour in ice cube trays with bars removed. Cover and freeze. Serve at room temperature.

S-ave or E-xit <S> s

ROUTED SHOPPING LIST

| Aisle | Quantity | Brand Name Specific Item |
|---|---|---|
| A5 | 2 | Hunt Tomatoes 15 oz |
| A8 | 1 | Pompeian Olive Oil 4 oz |
| B4 | 1 | Morton Iodized Salt |
| B5 | 1 | McCormick Parsely |
| C3 | 1 | Gulden's Hot Mustard 8oz |
| C3 | 1 | Oscar Meyer Bacon 8oz |
| C4 | 1 | Crystal Chili Sauce 6oz |
| C8 | 1 | Spice Island Cayenne 0.39oz |
| D1 | 1 | Shredded Swiss Cheese 8oz |
| D3 | 2 | Publix Premium Grade Eggs |
| D5 | 1 | Sealtest Heavy Cream 1 pint |
| F3 | 1 | Highliner Froz. Shrimp 8oz. |
| F8 | 1 | Pet Ritz Frozen Pie Shell 12oz |
| G | 1 | Progresso Bread Crumbs |
| G4 | 1 | Musselman's White Vinegar 16oz |
| L5 | 1 | Lawry's Minced Onion 3.75oz |
| S4 | 1 | Dixie Crystal Powder Sugar 1lb |
| S4 | 1 | McCormick Vanilla 2oz. |
| S4 | 1 | McCormick Chopped Chive 0.12oz |
| S7 | 1 | McCormick Paprika 1.75 oz |
| S8 | 1 | Dukes Peanut Oil 32 oz. |
| S9 | 1 | Dixie Crystal Sugar 32oz. |
| T6 | 1 | Spice World Garlic 2 oz |

What is claimed is:

1. An apparatus comprising a series of interconnected modules for composing brand name specific advertising media based upon a combination of sponsor and consumer input, said apparatus comprising:
   (a) a first module for creation, in non-volatile memory, of one or more brand name specific meal-recipe data files based upon sponsor designation of one or more ingredients of a meal-recipe as its brand name product, said sponsor designation representing different unrelated suppliers, said meal-recipe file being organized and retrievable by one or more fields and in combinations of one or more fields;
   (b) a second module for retrieval of said data from said brand name specific meal-recipe file, in the form of brand name specific meal-recipe plans, from the module specified in subparagraph (a) above, bsed upon consumer input of prescribed consumer oriented criteria; and
   (c) a third module for displaying the brand name specific meal-recipe plan which has been retrieved from the brand name specific meal-recipe files, said display means including an electronic display and/or permanent copy of such plan, the format of said meal-recipe plan identifying each ingredient of said plan, having sponsor designation, by brand name, or as a generic ingredient, in the absence of sponsor designation, said sponsor designation representing different unrelated suppliers,
each of said modules being interactive with one another and either integrated within a data processing equipment or existing as stand-alone components, said stand-alone components being part of an interactive data processing network.

2. The apparatus of claim 1, wherein the brand name specific files are organized so as to permit a sponsor, or a potential sponsor, to identify all meal-recipes which include ingredients which are common to the sponsor's product line.

3. The apparatus of claim 1, wherein the brand name specific files are organized so as to permit a sponsor to feature its products based upon regional preference, time of year, seasonal availability of complementary ingredients, ethnic preference, dietary preference, and/or one or more combinations thereof.

4. The apparatus of claim 1, wherein said apparatus includes means for modification of the brand name specific file to add, delete, or change sponsorship of an ingredient of a recipe, such addition, deletion or alteration being affected in accordance with an established file architecture.

5. The apparatus of claim 1, wherein the retrieval means also includes means for editing, saving and deletion of meal-recipes in advance of generation of a permanent copy thereof.

6. The apparatus of claim 1, wherein the display means includes a printer.

7. The apparatus of claim 1, wherein the advertising media generated on such apparatus is formatted in the form of a recipe file card and the ingredients having sponsor designation being identified by brand name.

8. The apparatus of claim 1, wherein the advertising media generated on such apparatus is formatted as an integrated shopping list combining all of the ingredients of the meal-recipe plan in a single integrated list and the ingredients having sponsor designation being identified by brand name.

9. A method for generation of brand name specific advertising media based upon a combination of sponsor and consumer input, said method including the steps of:
   (a) creating one or more brand name specific meal-recipe files based upon sponsor designation of one or more ingredients of a mean-recipe as its brand name products, said meal-recipe file being organized and retrievable by one or more fields and in combination of one or more fields and said sponsor designation representing different unrelated suppliers;

(b) creating a meal-recipe plan by retrieving data contained in the brand name specific meal-recipe file in response to consumer oriented criteria and based upon the available data in the brand name specific meal-recipe file;

(c) displaying said meal-recipe plan in a format which identifies each ingredient of said metal-recipe plan having sponsor designation representing different unrelated suppliers, by brand name, or as a generic ingredient, in the absence of sponsor designation; and (d) creating a permanent copy of said meal-recipe plan for assistance of the consumer in his purchasing decisions by providing said meal-recipe plan to said consumer in a format which identifies by brand name, each ingredient of said meal-recipe plan having sponsor designation, representing different unrelated suppliers, or as generic in the absence of sponsor designation.

10. The method of claim 9, wherein the advertising media is formatted as a recipe file card identifying by brand name, each ingredient having sponsor designation, or as generic in the absence of sponsor designation.

11. The method of claim 9 wherein the advertising as formatted as a shopping list combining all of the ingredients from the meal-recipe plan into a single integrated listing, identifying by brand name, each item having sponsor designation, or as generic, in the absence of sponsor designation.

12. A method for the creation of a brand name specific meal-recipe file, comprising:
(a) preparing a system master file of meal plans and recipes in which each of the ingredients of the recipe are identified by a common generic designation;
(b) preparing a system master file of brand name products and corresponding sponsors wherein each brand name product is identified by a common generic designation, said sponsors representing different unrelated suppliers;
(c) merging said meal-plan recipe systems master file and said brand name specific systems master file pursuant to sponsor selected criteria.

13. The method of claim 12, wherein the systems master files are organized as indexed sequential files.

14. An apparatus comprising a module for the creation of brand name specific advertising media based upon a combination of sponsor and consumer input, said apparatus including:
(a) means for entry of consumer selections, from among a prescribed number of available choices, into a brand name specific file of recipes, wheren said recipes are composed of individual ingredients and at least some of said ingredients are identified b the brand name of sponsors, said sponsors representing different unrelated suppliers;
(b) means for the assembly of an interim listing of such consumer selections; and
(c) means for editing of the interim listing.

15. The apparatus of claim 14, wherein the means for entry of the consumer selections is a touch screen of a computer display.

16. The apparatus of claim 14, wherein the means for entry of the consumer selection is a computer keyboard.

17. The apparatus of claim 14, wherein the brand name specific files are organized so as to permit a sponsor to feature its products based upon regional preference, time of year, seasonal availability of complementary ingredients, ethnic preference, dietary preference, and/or one or more combinations thereof.

18. An apparatus comprising a series of interconnected modules for generation of brand name specific advertising media based upon a combination of sponsor and consumer input, said apparatus comprising:
(a) a first module for creation, in non-volatile memory, of one or more brand name specific data files based upon sponsor designation, representing different unrelated suppliers, of one or more items in prescribed fields of classification which are related to a specific consumer oriented environment, said files being organized and retrievable by one or more fields and in combinations of one or more fields;
(b) a second module for retrieval of data from said brand name specific data file, in the form of a brand name specific ensemble of items from a module specified in subparagraph (a) above, based upon consumer input of prescribed consumer oriented criteria, and upon available data in the brane name specific files; and
(c) a third module for displaying the ensemble of items created in response to input of consumer criteria, said display means including a visual display and/or a permanent copy of such ensamble, the format of such ensembly identifying each such item thereof, having sponsor designation, by brand name, or as a generic item, in the absence of sponsor designation, said sponsor designation representing different unrelated suppliers, each of said modules being interactive with one another and either integrated within a data processing equipment or existing as stand-alone components, said stand-alone components being part of an interactive data processing network.

19. The apparatus of claim 18, wherein the consumer oriented environment is the supermarket and the brand name specific files contain recipes composed of individual ingredients wherein at least some of said ingredients are identified by brand name of the sponsor.

20. The apparatus of claim 18, wherein the consumer oriented environment is the travel agency and the brand name specific files contain at least one set of listings of various offerings from suppliers of vacation/travel goods and/or services, wherein at least some of such goods and/or services are identified by the name of a sponsor.

21. The apparatus of claim 18, wherein the consumer oriented environment is the financial counselor/independent insurance agent, and the brand name specific files contain at least one set of listings of the various offerings of underwriters of investment vehicles wherein at least some of said vehicles are identified by the name of a sponsor.

22. An apparatus comprising a module for the generation of brand name specific advertising media based upon a combination of sponsor and consumer input, said apparatus including:
(a) means for entry of consumer selections from among a prescribed number of choices available in brand name specific file composed of listing of related goods/services, wherein at least some of said goods/services are identified by the name of sponsors, said sponsors representing different unrelated suppliers;
(b) means for the assembly of an interim listing of such consumer selections; and
(c) means for editing of the interim listing.

* * * * *